US005655130A

United States Patent [19]

Dodge et al.

[11] Patent Number: 5,655,130

[45] Date of Patent: Aug. 5, 1997

[54] METHOD AND APPARATUS FOR DOCUMENT PRODUCTION USING A COMMON DOCUMENT DATABASE

[75] Inventors: Daniel R. Dodge, St. Paul; Susan L. Follett, Roseville; Anna Marie Grecco, Oakdale; Jean M. Tillman, Shoreview, all of Minn.

[73] Assignee: Unisys Corporation, Blue Bell, Pa.

[21] Appl. No.: 323,380

[22] Filed: Oct. 14, 1994

[51] Int. Cl.$^6$ .................... G06F 17/21

[52] U.S. Cl. .................... 395/772; 395/774

[58] Field of Search .................... 395/145–148, 395/155–161, 600; 304/401, 419.07, 419.1, 419.13, 419.17

[56] References Cited

U.S. PATENT DOCUMENTS

| | | | |
|---|---|---|---|
| 4,962,475 | 10/1990 | Hernandez et al. | 395/146 |
| 4,969,093 | 11/1990 | Barker et al. | 395/145 |
| 4,996,662 | 2/1991 | Cooper et al. | 395/600 |
| 5,038,316 | 8/1991 | Hempleman et al. | 395/146 |
| 5,050,071 | 9/1991 | Harris et al. | 395/600 |
| 5,119,491 | 6/1992 | Iwai et al. | 395/600 |
| 5,181,162 | 1/1993 | Smith et al. | 364/419.19 |
| 5,222,236 | 6/1993 | Potash et al. | 395/600 |
| 5,233,513 | 8/1993 | Doyle | 364/401 |
| 5,251,314 | 10/1993 | Williams | 395/600 |
| 5,280,574 | 1/1994 | Mizuta et al. | 395/146 |
| 5,432,903 | 7/1995 | Frid-Nielson | 395/161 |

OTHER PUBLICATIONS

Jean Tillman, "Documenting a Prolific Product: A Unique Approach, " *Technical Communication*, pp. 546–548 Fourth Quarter, 1991.

Unisys, "Introducing the Common Documentation System" pp. i–ix, 1–1 thru 4–5; copyright 1992 Unisys Corporation.

ArborText, Inc. "Getting Started with SGML" A guide to Standard Generalized Markup Language and its role in information management. pp. 1–15 and backsheets, copyright 1992.

Collin Maunder, "Documentation on tap" *IEEE Spectrum*, pp. 52–56, Sep. 1994.

Jean Tillman, et al, "Doing Away with Redundancy: Using a Single Source for Multiple Versions, " *Society for Technical Communication*, pp. 1–69, May, 1994.

*Primary Examiner*—Joseph H. Feild

*Attorney, Agent, or Firm*—Schwegman, Lundberg, Woessner & Kluth, P.A.

[57] ABSTRACT

A system and method for producing a variety of documents from a common document database. A document is partitioned into a number of encapsulated data elements. One or more classes of variations are defined and variation names are associated with each class. Data elements within the document are tagged with one or more variation names and placed within a document database; the resulting document database can be filtered and formatted to form variation-specific documents.

32 Claims, 22 Drawing Sheets

BEFORE YOU LEAVE FOR WORK INTHE MORNING YOU SHOULD DO ALL THE FOLLOWING THINGS:

- GET DRESSED
- EAT BREAKFAST
- CHECK THE TRAFFIC REPORT ON THE RADIO

CAUTION

IF YOU DON'T CHECK THE TRAFFIC REPORT ON THE RADIO BEFORE YOU VENTURE ONTO 1-94. YOU MAY EXPERIENCE SOME DELAYS.

FIG. 6a

<P>BEFORE YOU LEAVE FOR WORK IN THE MORNING YOU SHOULD DO ALL THE<br>
FOLLOWING THINGS:</P><br>
<BLI><br>
<LE>GET DRESSED</LE><br>
<LE>EAT BREAKFAST</LE><br>
<LE>CHECK THE TRAFFIC REPORT ON THE RADIO</LE><br>
</BLI><br>
<CAUTION><HEAD>CAUTION</HEAD><br>
<P>IF YOU DON'T CHECK THE TRAFFIC REPORT ON THE RADIO BEFORE YOU VENTURE<br>
ONTO I-94. YOU MAY EXPERIENCE SOME DELAYS.<br>
</P></CAUTION>

FIG. 6b

```
   <!-- ·············································································· -->
   <!--     ELEMENT    MIN     CONTENT                                                    -->
   <!--     ATTRIB     VALUE   DEFAULT                                                    -->
   <!-- ·········································82·········································· -->
80~<!ELEMENT GUIDE        -0 (FRONT.BODY.BACK?.USERCOM.BINDER.BARCODE)                   >
   <!ATTLIST GUIDE  VERSION (DRAFT|FINAL)                          DRAFT
                  NUMDEPTH (1|2|3|4|5)                             1
                   NPDEPTH (ONE|TWO|THREE|FOUR|FIVE)               ONE
                  TOCDEPTH (FIRST|SECOND|THIRD|FOURTH|FIFTH)       THIRD
                   RHDEPTH (LEV1|LEV2|LEV3|LEV4|LEV5)              LEV1                   >
   <!>                      84      86       88        90      92
82~<!ELEMENT FRONT        -0 (RUNHEAD?.COVERPG.TITLEPG.DISCIMPG.STATUS.
                             PREFACE.TOC.TOF?.TOT?.TOE?)                                 >
                              94    96   98    100   102
   <!>
86~<!ELEMENT COVERPG      -0 (SYSTYPE?.PRODUCT?.ACRO?.TASK?.DOCTYPE.
                             (VOLNUM.VOLID)?.PRETITLE?.PUBMONTH.PUBYEAR.
                             DISCODE?.PRINTLOC?.PRCINFO.                 108
                             ((FORMNO.PCNNUM?)|(UPNO)).PLSCODE?)                          >
   <!>
   <!ELEMENT (SYSTYPE|PRODUCT|ARCO|PRETITLE)
                          -0 (#PCDATA|TM|RTM|SM|SUP|SUB)+                                 >
   <!>
   <!ELEMENT (TASK|DOCTYPE|VOLNUM|VOLID|PUBMONTH|DISCODE|FORMNO|PCNNUM)
                          -0 (#PCDATA)                                                    >
   <!>
   <!ELEMENT UPNO         -0 (#PCDATA)                                                    >
   <!>
   <!ELEMENT PRINTLOC     -0 (#PCDATA)                                                    >
   <!>
   <!ELEMENT PRCINFO      -0 (#PCDATA)                                                    >
   <!>
```

```
     <!-- .............................................................. -->
     <!--    ELEMENT    MIN    CONTENT                                      -->
     <!--    ATTRIB     VALUE  DEFAULT                                      -->
     <!-- .............................................................. -->
116~<!ELEMENT GUIDE      -0 (CDSINFO?.FRONT.BODY.BACK?.USERCOM.BINDER.
                             BARCODE)                                        >

     <!ATTLIST GUIDE VERSLON (DRAFT|FINAL)                        DRAFT
                    NUMDEPTH (1|2|3|4|5)                          1
                     NPDEPTH (ONE|TWO|THREE|FOUR|FIVE)            ONE
                    TOCDEPTH (FIRST|SECOND|THIRD|FOURTH|FIFTH)    THIRD
                     RHDEPTH (LEV1|LEV2|LEV3|LEV4|LEV5)           LEV1       >
     <!>
   ┌ <!ELEMENT CDSINFO    -- (CLASS)+                                        >
   │ <!ELEMENT CLASS      -0 (#PCDATA.(NAME+))                               >
   │ <!ATTLIST CLASS    TYPE NUTOKEN               #REQUIRED
   │                     STD (YIN)                 N                         >
   │        120
114│ <!>
   │ <!ELEMENT NAME—122   -0 (#PCDATA)                                       >
   └ <!ATTLIST NAME      CDS NMTOKEN               #REQUIRED                 >
     <!>
118~<!ELEMENT FRONT      -0 (RUNHEAD?.COVERPG.TITLEPG.DISCLMPG.STATUS.
                             PREFACE.TOC.TOF?.TOT?.TOE?)                     >

     <!>
     <!ELEMENT COVERPG    -0 (SYSTYPE?.PRODUCT?.ACRO?.TASK?.DOCTYPE.
                             (VOLNUM.VOLID)?.PRETITLE?.PUBMONTH.PUBYEAR.
                             DISCODE?.PRINTLOC?.PRCINFO.
                             ((FORMNO.PCNNUM?)|(UPNO)).PLSCODE?)             >
```

```
<!>
<!ELEMENT (SYSTYPE|PRODUCT|ARCO|PRETITLE)
                   -O (#PCDATA|TM|RTM|SM|SUP|SUB)+          >
<!>
<!ELEMENT (TASK|DOCTYPE|VOLNUM|VOLID|PUBMONTH|PUBYEAR|DISCODE|FORMNO|
          PCNNUM)
                   -O (#PCDATA)                              >
<!>
<!ELEMENT UPNO      -O (#PCDATA)                              >
<!>
<!ELEMENT PRINTLOC  -O (#PCDATA)                              >
<!>
<!ELEMENT PRCINFO   -O (#PCDATA)                              >
<!>
```

FIG. 8ab

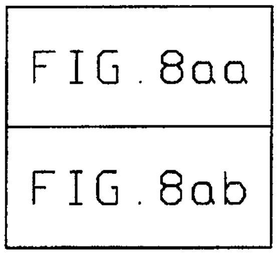

FIG. 8a

```
      <!DOCTYPE GUIDE SYSTEM "XXX,DID">
116 — <GUIDE>
      <CDSINFO>
120 — <CLASS TYPE=1>PLATFORM
122   <NAME CDS=PLAT-A>PLATFORM A
      <NAME CDS=PLAT-B>PLATFORM B      — 114
      <NAME CDS=PLAT-C>PLATFORM C
      <NAME CDS=PLAT-D>PLATFORM D
      </CLASS>
      </CDSINFO>
118 — <FRONT>
```

FIG. 8c

126— 1. IMPLEMENTING CDS

128— ☐PLATFORM A   ☐PLATFORM B   ☐PLATFORM C   ☐PLATFORM D  ← 132
                                                    ↑ 124

130— OVERVIEW   THIS SECTION PROVIDES A SAMPLE OF HOW CDS IS IMPLEMENTED.
                AS INDICATED BY THE FILLED HEADING CHECKBOXES, THIS SECTION
                IS APPLICABLE TO PLATFORM A, PLATFORM B, AND PLATFORM C. THIS
                SECTION IS NOT APPLICABLE TO PLATFORM D.

┌─────────────┐
         │ PLATFORM A  │  THIS PARAGRAPH ONLY APPLIES TO PLATFORM A. ← 134
         │ PLATFORM B  │  THIS PARAGRAPH ONLY APPLIES TO PLATFORM B. ← 136
         └─────────────┘
              ↑ 140
         ┌─────────────┐
  142 ── │ PLATFORM A  │  THIS PARAGRAPH ONLY APPLIES TO PLATFORM A AND PLATFORM C. ← 138
         │ PLATFORM C  │
         └─────────────┘

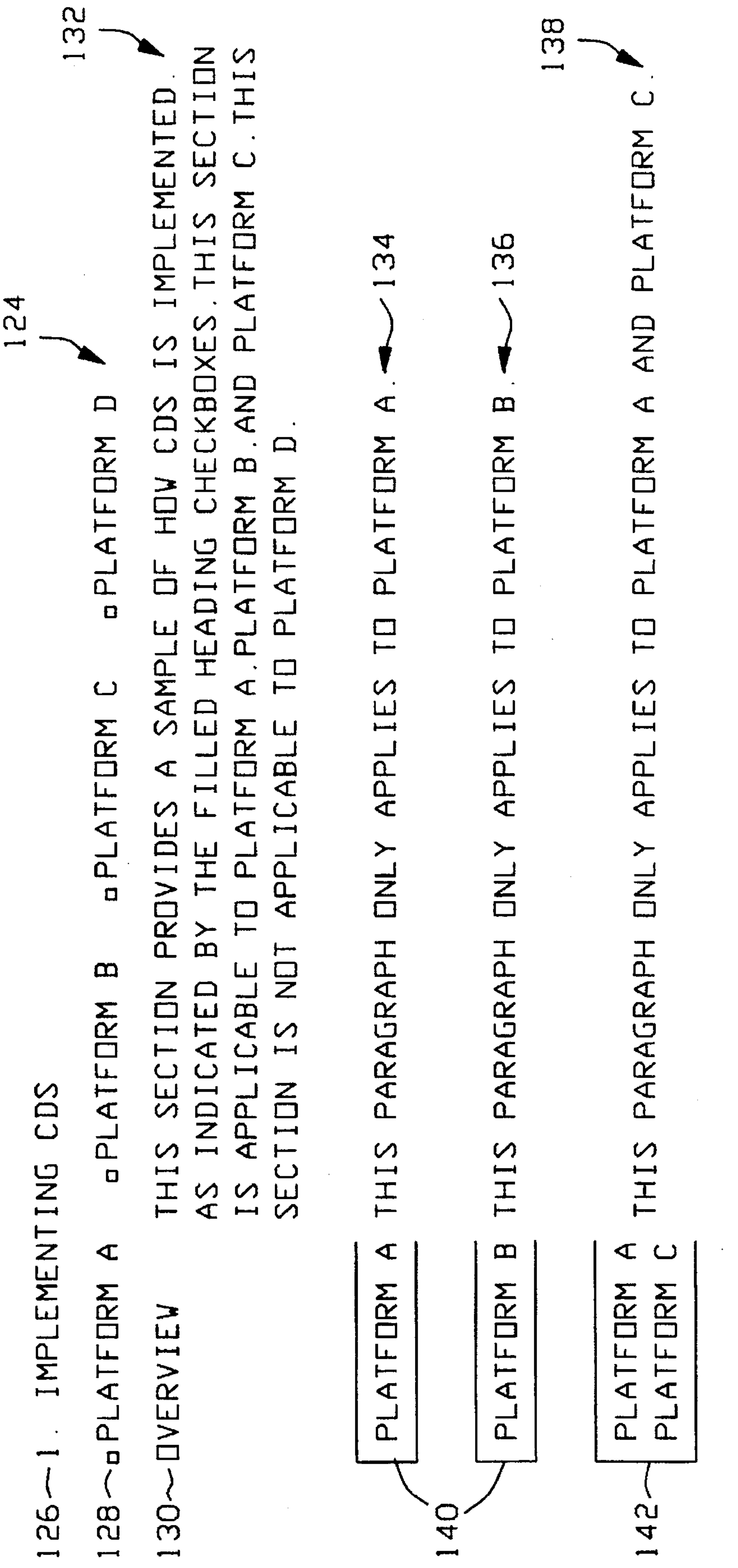

FIG. 9a

```
    <BODY>
144 <LEV1 CDS="PLAT-A PLAT-B PLAT-C">
    <HEAD>IMPLEMENTING CDS
    </HEAD>
    <BLOCK>
    <HEAD>OVERVIEW
    </HEAD>
    <P>THIS SECTION PROVIDES A SAMPLE OF HOW CDS
    IS IMPLEMENTED. AS INDICATED BY THE FILLED
    HEADING CHECKBOXES.THIS SECTION IS APPLICABLE
146 TO PLATFORM A.PLATFORM B.AND PLATFORM C. THIS
    SECTION IS NOT APPLICABLE TO PLATFORM D.
    </P>
148 <P CDS="PLAT-A">THIS PARAGRAPH ONLY APPLIES
    TO PLATFORM A.
    </P>
150 <P CDS="PLAT-B">THIS PARAGRAPH ONLY APPLIES
    TO PLATFORM B.
    </P>
152 <P CDS="PLAT-A PLAT-C">THIS PARAGRAPH
    APPLIES TO PLATFORM A AND PLATFORM C.
    </P>
    </BLOCK>
    <LEV1>
```

FIG. 9b

```
    <!DOCTYPE GUIDE SYSTEM"XXX.DTD">
    <GUIDE>
    <CDSINFO>
    <CLASS TYPE=1>PLATFORM
154 <NAME CDS=PLAT-A>PLATFORM A
    <NAME CDS=PLAT-B>PLATFORM B               153
    <NAME CDS=PLAT-C>PLATFORM C
    </CLASS>
    <CLASS TYPE=2>AUDIENCE
156 <NAME CDS=NOVICE>NOVICE
    <NAME CDS=EXPERT.EXPERT
    </CLASS>
    </CDSINFO>
    <FRONT>
    •
    •
    •
    <BODY>
    <LEV1 CDS="PLAT-A PLAT-B">
    <HEAD>IMPLEMENTING CDS
    </HEAD>
    <BLOCK>
    <HEAD>OVERVIEW
    </HEAD>                                          160
    <P CDS="NOVICE EXPERT">THIS PARAGRAPH APPLIES
158 TO THE PLATFORM A AND PLATFORM B VARIATIONS
    IN THE PLATFORM CLASS AND TO THE NOVICE AND
    EXPERT VARIATIONS IN THE AUDIENCE CLASS.
    </P>                                             164
    <P CDS="NOVICE">THIS PARAGRAPH APPLIES TO THE
162 PLATFORM A AND PLATFORM B VARIATIONS IN THE
    PLATFORM CLASS.BUT APPLIES ONLY TO THE NOVICE
    VARIATION IN THE AUDIENCE CLASS.
    </P>                                             168
    <P CDS="EXPERT">THIS PARAGRAPH APPLIES TO THE
166 PLATFORM A AND PLATFORM B VARIATIONS IN THE
    PLATFORM CLASS.BUT APPLIES ONLY TO THE EXPERT
    VARIATION IN THE AUDIENCE CLASS.
    </P>
    </BLOCK>
```

FIG. 10a

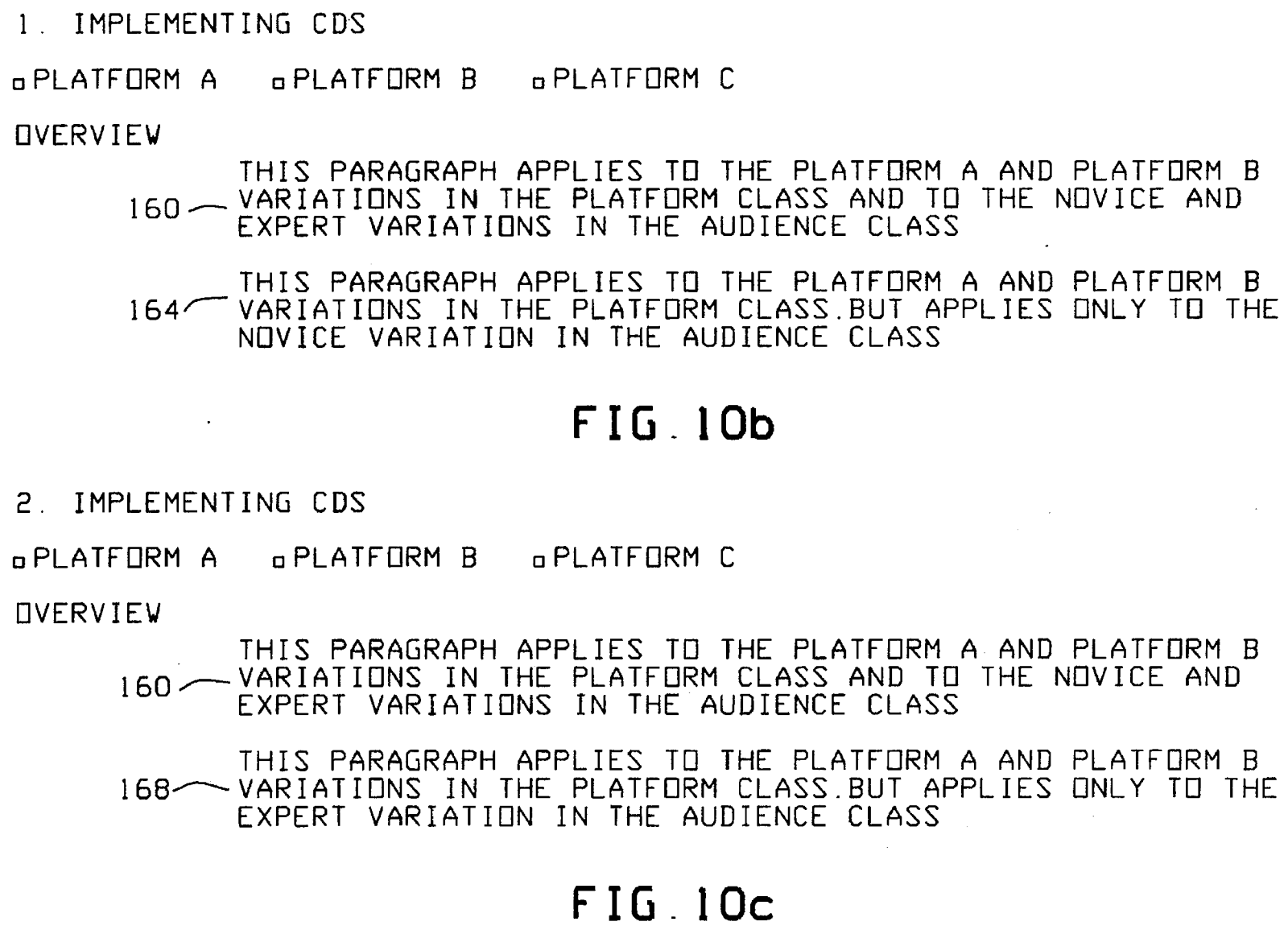

1. IMPLEMENTING CDS

□PLATFORM A □PLATFORM B □PLATFORM C

OVERVIEW

160 THIS PARAGRAPH APPLIES TO THE PLATFORM A AND PLATFORM B VARIATIONS IN THE PLATFORM CLASS AND TO THE NOVICE AND EXPERT VARIATIONS IN THE AUDIENCE CLASS

164 THIS PARAGRAPH APPLIES TO THE PLATFORM A AND PLATFORM B VARIATIONS IN THE PLATFORM CLASS.BUT APPLIES ONLY TO THE NOVICE VARIATION IN THE AUDIENCE CLASS

FIG. 10b

2. IMPLEMENTING CDS

□PLATFORM A □PLATFORM B □PLATFORM C

OVERVIEW

160 THIS PARAGRAPH APPLIES TO THE PLATFORM A AND PLATFORM B VARIATIONS IN THE PLATFORM CLASS AND TO THE NOVICE AND EXPERT VARIATIONS IN THE AUDIENCE CLASS

168 THIS PARAGRAPH APPLIES TO THE PLATFORM A AND PLATFORM B VARIATIONS IN THE PLATFORM CLASS.BUT APPLIES ONLY TO THE EXPERT VARIATION IN THE AUDIENCE CLASS

FIG. 10c

METHOD AND APPARATUS FOR DOCUMENT PRODUCTION USING A COMMON DOCUMENT DATABASE

FIELD OF THE INVENTION

The present invention relates to computer-implemented methods of document production, and in particular to a system and method for producing a variety of documents from a common document database.

BACKGROUND

Documenting software products and other technical subjects has always been difficult. The technical writer must learn the subject and write a document that helps the reader understand the subject, find information quickly, and troubleshoot problems. The more complex the subject, the more difficult the writer's task. Each significant advance in modem technology brings a new level of complexity and challenge for the writer of technical documentation.

A Common Problem: Documenting Multiple Variations of a Subject

For example, consider the case of a set of user manuals for a software product. When a new product is first released, it typically operates on only one hardware platform, such as a personal computer (PC), a workstation or a specific mainframe system. One set of user manuals is created for the product. During the software product life cycle, however, the product will generally become increasingly sophisticated and will be upgraded to run on additional hardware platforms. Now the documentation must not only track the increased sophistication but also adapt to variations in operation introduced by the new hardware platforms.

In the past, technical writers have used one of two approaches to handle variations (such as multiple hardware platforms) in a product offering. In the first approach, each variation is documented separately. That is, the writers will write documentation for the initial product and then modify or rewrite that document for each product variation. The result is a sequence of technical documents having a common ancestor, but no more. Changes to one document are not necessarily reflected in another document. The separate variations of the documents quickly become inconsistent and hard to manage. The redundant documents are costly for the companies to produce and maintain and are less usable for customers who want to compare related products.

In the second approach, all variations are documented together in a single document, with variation-specific information intermixed with common information. For customers who want information about only one variation, such an approach can be confusing. They may, for instance, find it difficult to separate the information relating to their specific variation from information relating to the other variations.

This problem of documenting multiple variations of information is a common one. For software documentation, other examples include products that implement multiple variations of a standard or run on multiple graphical user interfaces. And the problem is not limited to software documentation. For example, a piece of equipment, such as a television, lawn mower, or kitchen appliance, often comes in several models, each with its own variation of instructions. A course workbook might be developed for a subject that will be taught to novice, intermediate, or advanced students, each with variations of similar information. Even a cookbook might include recipes with variations for low-cholesterol, low-sodium, or diabetic diets.

Existing Document Generation Systems and/heir Limitations

To produce documentation, in both printed and electronic forms, technical writers use document generation systems. Most document generation systems today use a form of procedural (or physical) markup within the source data files. Procedural markup specifies the presentation of a particular region of text in an output document, such as the use of bold or italics for emphasis. This type of markup is specific to one particular output format.

Procedural markup has an inherent limitation: It inhibits the reuse of text. Because it specifics formatting characteristics, such as bold or shading, procedural markup docs not facilitate reuse of text for different output media, For example, the formatting command that specifies a shaded region of text for printed output has no corresponding presentation technique for on-screen presentation. Or a table structure with horizontal and vertical boundaries may need to be displayed differently on the screen than it is on paper. And font styles and sizes might be different for paper and on-screen display.

Another reason procedural markup inhibits reuse is that it is often system-dependent. The formatting codes used for one document generation system are generally incompatible with other document generation systems. When writers using different document generation systems need to share text, they often must convert the files from the format of the sender's document generation system to a plain text, or ASCII format, which removes all procedural markup codes. Then the receiver must insert the procedural markup codes of his/her document generation system into the ASCII file. This is obviously labor-intensive, time-consuming, and costly.

Another limitation of existing document generation systems is their inability to encapsulate information about text. For example, a given paragraph or table might apply to a given variation (such as hardware platform), but there is no inherent way to attach this information to the text so that variation-specific documents can be generated.

SGML: A Standard That Promotes Reuse

To address the inherent limitations with existing document generation systems, the ISO 8879 Standard Generalized Markup Language (SGML) was published in 1986, and it has become increasingly popular in the industry. SGML is a language for describing the structure and content of a document. It is a structural, not procedural (or physical) markup language. In structural markup languages, the markup used within the source dam files identifies the kind of information stored in each data element (such as heading, paragraph, table), rather than the physical presentation of that element (such as typeface or table format). Therefore, text authored with SGML is highly reusable. The same text can be reused for various output media (such as printed documents and on-screen help text), and it is system-independent so it can be shared by writers using different document generation systems.

To understand SGML, it is helpful to briefly examine the SGML tags and how they are used in a source data file. Each tag is enclosed in greater than and less than symbols (<>); for example, a tag that specifies the beginning of a paragraph might look like <p>. In an SGML source data file, each of the various elements is clearly distinguished with beginning and ending tags. The ending tags are preceded by a forward slash (/) character. Authors can use commercially available software tools to insert the required tags into the data file, or they can code the markup directly using an ASCII editor.

The specific names used for the tags within an SGML data file and the hierarchical relationships between the various elements are based on a set of rules, called a Document Type Definition (DTD). The DTD is written according to a rigorous language defined by the ISO 8879 standard. The rules described by the DTD follow standards that have been defined for a particular type of information data element (e.g., a bullet list must contain more than one bullet, a second level heading must precede a third level heading).

In a typical SGML implementation, the SGML source file and its associated DTD are read into a validation software program. The validation program parses the source file and determines whether the file conforms to the rules defined by the DTD. If any rules are violated, an error is detected. Errors can range from syntax errors, such as misspellings, to missing elements. When validation is successful, all elements needed to make up a document are present in the correct order. The data is then ready for production (formatting), a stage that is handled by software applications that format the SGML data elements for specific output mediums. More information on SGML and on the use of SGML data files and Document Type Definitions can be found in *Standard Generalized Markup Language* (*SGML*) *International Standard* (*ISO*) 8879, *First Edition in SGML* (*ISO*) 8879: 1986/*Amendment* 1, both published in 1986. Both publications are available from Graphic Communications Association (GCA) Publications and Resources in Alexandria, Va.

SGML and Object-Oriented Information Management

The concept of object orientation has become popular in the field of computer programming because it enables reuse of programming code objects. Similarly, the concept of object orientation can be applied to technical writing, where "objects" of documentation (including text, graphics, and other forms) can be reused in many ways for many different documents. This object-oriented information management addresses many of the problems associated with authoring increasingly complex technical documentation.

By definition, SGML provides a mechanism for object-oriented integrated information management. Under an object-oriented information management strategy, individual snippets (or objects) of data become part of an organization's database of information. Documents are then formed by piecing together pertinent objects. SGML provides a mechanism for encapsulating data within information objects. For example, data describing an object's purpose or links to other objects may be encapsulated within an information object.

As a standard language specification, however, SGML defines only the way information is described in the source data files. SGML does not define how to manipulate the data elements or how to generate output documents from the source data files. Although SGML provides the ability to encapsulate data within information objects, it does not define a method or system for manipulating the information objects in order to produce a variety of documents from a single document file.

There is a need in the art for a method of authoring a single source document that contains multiple variations of a subject such that the single source document can be used to generate a variety of documents based on these variations. In addition, there is a need in the art for a system for using that source document to generate a document tailored to each variation or documents containing combinations of variations, where variation-specific information is clearly identified.

Finally, there is a need in the art for a system and method of producing documents that can identify data encapsulated within an information object as specific to a particular variation, that can manipulate the encapsulated data objects, that can generate multiple output documents from a single source file that contains information for multiple variations, and that permits variety in the presentation of the encapsulated variation data in the output documents.

SUMMARY

The present invention is a system and method for producing a variety of documents from a common document database. A document is partitioned into a number of encapsulated data elements. One or more classes of variations are defined and variation names are associated with each class. Data elements within the document are tagged with one or more variation names and placed within a document database; the resulting document database can be filtered and formatted to form variation-specific documents.

According to another aspect of the present invention, a method of creating custom documentation is described. A document having a plurality of encapsulated data elements and a set of rules detailing a relationship between the encapsulated data elements is provided. Each encapsulated data element may be associated with one or more classes, wherein each class includes a plurality of variation names. A document is created by selecting a set of the variation names of data elements to be included in the document and then collecting a set of data elements having those attributes as a filtered dam file. The filtered data file is formatted and output as a custom document.

BRIEF DESCRIPTION OF THE DRAWINGS

In the drawings, where like numerals refer to like components throughout the several views.

FIGS. 6*a* and 6*b* show a document segment and its corresponding SGML data file;

FIGS. 7*a* and 7*b* show a representative Document Type Definition and its hierarchy;

FIGS. 8*aa*–8*ab*, 8*b*, and 8*c* show a Document Type Definition, its hierarchy, and a corresponding SGML data file, respectively, for one embodiment of the CDS configuration as defined by the present invention;

FIGS. 9*a* and 9*b* show a representative output document segment and its corresponding SGML data file for one embodiment of the present embodiment;

FIG. 10*a*, 10*b*, and 10*c* show an SGML data file containing two classes of variations and two corresponding output documents according to one embodiment of the present invention;

DETAILED DESCRIPTION OF THE PREFERRED EMBODIMENTS

Figure 1:
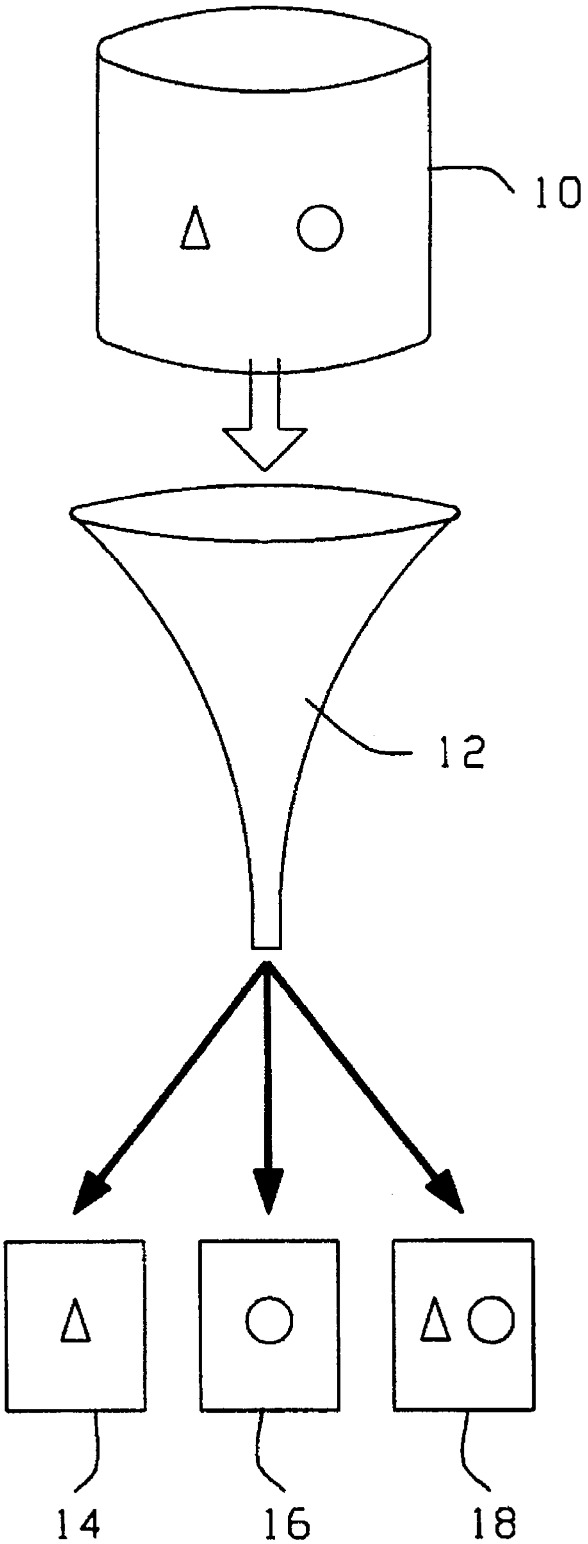
FIG. 1 shows a conceptual model of a document generation system according to the present invention.

In the following detailed description of the preferred embodiment, reference is made to the accompanying drawings which form a part hereof, and in which is shown by way of illustration specific embodiments in which the inventions may be practiced. It is to be understood that other embodiments may be utilized without departing from the spirit and scope of the present inventions. The following detailed description is, therefore, not to be taken in a limiting sense. Instead the scope of the present inventions is defined by the appended claims.

Glossary

This application is complex and the following terms will be abbreviated to preserve the flow of the document:

CDS—Common Documentation System: An authoring methodology and information data model that focuses on combining multiple variations of information into a single document source database. From this database, many different types of printed or electronic documents can be produced.

DTD—Document Type Definition: A set of rules which define the relationship between data elements in an SGML source file.

PC—personal computer

SGML—Structural Generalized Markup Language: SGML is a language for describing the structure and content of a document. It is a structural markup language published as ISO 8879 in 1986.

Definitions

The following terms and concepts are used in the description of the invention:

author: A person who creates or modifies a database used to produce a CDS document.

class: An author-specified category of variations used within Common Documentation System (CDS) documents.

custom document: A document, generated from a source file containing multiple variation of information, that contains a subset of the variations included in the source file. The custom document may be generated by the document author or by the end user.

database: A collection of source files created by authors and used to produce documents. With the CDS methodology, a single database is used for multiple variations of information.

document: A printed document, electronic document, courseware, computer-based trig package, or any deliverable that describes or trains people in a product, service, procedure, or concept.

encapsulated data element: A unit of information that makes up a document, consisting of information (such as a paragraph or illustration), along with data about that information (such as its purpose, the variations it applies to, or links to other encapsulated data elements). Also commonly referred to as information objects.

end user: A person who uses documents, such as a programmer who uses a programming reference manual.

information data model: A conceptual aid used to describe concepts of an information (document) database. It includes a description of encapsulated data elements within a database and the structure and relationships of those elements. The CDS information data model describes the information included in the databases to enable programmatic application of the output and suppression of variation-specific information.

methodology: A system of principles, processes, and practices applied to a specific branch of knowledge (which, in this paper, is the authoring of documents).

platform: Hardware or operating system, such as a specific personal computer, midrange, or mainframe system.

variation name: An identifier for a variation within a class as defined by the CDS information data model.

The Common Documentation System

The COMMON DOCUMENTATION SYSTEM (hereinafter "CDS") defines an authoring methodology and information data model that focuses on combining multiple variations of document data into a single document source database. From this database, many different types of printed or electronic output documents can be generated to suit the specific needs of the users as well as the creators of the documentation. From a single source database, the system generates a combined document containing information for all variations, multiple documents containing information for combinations of variations, and/or a separate document for each variation. (COMMON DOCUMENTATION SYSTEM and CDS are trademarks of Unisys Corporation, the assignee of the present invention.)

A conceptual model of a CDS document generation system is shown in FIG. 1. As shown in FIG. 1, a document database 10 contains multiple variations of information (represented in the figure as a triangle and a circle). A document database processor 12 processes this database, filtering out any variations specified by the author, and generates tailored output documents. Depending on the input from the author, the system generates one output document 14 containing one variation (represented by the triangle), another output document 16 containing the other variation (represented by a circle), and/or another output document 18 containing both variations.

Here is an example of how the CDS document generation system might be used. Suppose a software product runs on a PC, a UNIX system, and a mainframe. The software basically operates the same on all three platforms, but there are significant differences that must be addressed in the user documentation. A typical documentation group would create, generate, and deliver three separate sets of documentation-one for each platform. This is inefficient, redundant, and costly for the documentation group. And customers who use the product on two or three of the platforms must use separate, redundant document sets.

Figure 2:
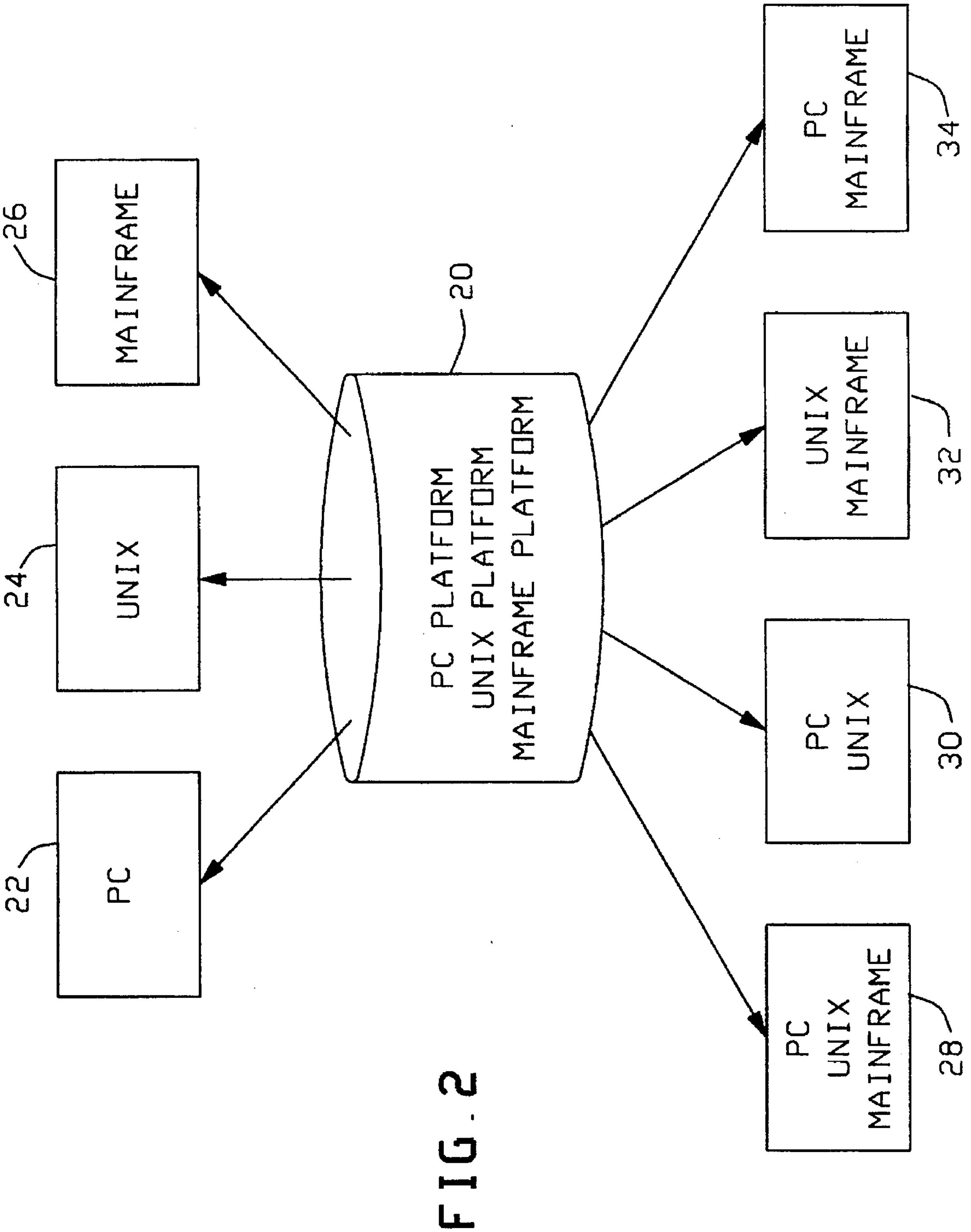
FIG. 2 shows an example document database implemented using a document generation system according to the present invention.

FIG. 2 shows how CDS can solve these problems. Using CDS, the author creates a single document database 20 containing information for all three platforms. Depending on the author's input, the system generates any of the following documents: A document 22 containing information for the PC only, a document 24 for UNIX only, a document 26 for the mainframe only, a document 28 that contains all three platforms, a document 30 that contains PC and UNIX only, a document 32 that contains UNIX and mainframe only, and/or a document 34 that contains PC and mainframe only. In one embodiment, in documents (e.g., 28, 30, 32, 34) containing more than one variation, the information specific to each platform is visually identified in the text of the output document.

In another embodiment, for documents delivered in electronic form (such as CD-ROM) that contain multiple variations (such as the three platforms), the vendor uses search and retrieval software to suppress information specific to one or more variations. For example, while viewing an electronic document containing information for the PC, UNIX, and mainframe, a user interested in only information about the mainframe version can suppress the PC and UNIX information. In this way, users electronically tailor their view of the document so it includes only the information they want to see.

The use of CDS to document software products on multiple platforms is a typical application of CDS, but it is not the only one. Any time there are multiple variations of a subject, CDS can be used to develop, produce, and maintain the documentation.

In one embodiment, more than one type of variation can be used. These variation types are called "classes." For example, a document might have one class, called "platform," which has three variations: PC, UNIX, and mainframe. The same document might also have another class called "audience" which has two variations: novice and expert. A particular data element may apply to any combination of classes and variations. For example, a paragraph might apply to the PC and UNIX variations of the "platform" class as well as to the novice variation of the "audience" class. The ability to have multiple classes with multiple variations within each class maximizes flexibility and efficiency in authoring documents.

Following is a detailed description of the CDS information data model and authoring methodology.

The CDS Information Data Model

An information data model is a conceptual aid used to describe information stored in a database. In the CDS information data model, the data for a particular document is stored in a database as encapsulated data elements. An encapsulated data element is an object that contains two kinds of information: 1) The information itself (such as an actual paragraph, table, or graphic), and 2) Classifying data about that information, including its structure (such as the fact that it is a paragraph structure or table structure) and which class or variation the information applies to. These encapsulated data elements can then be combined in a number of variation-specific documents.

Figure 3:
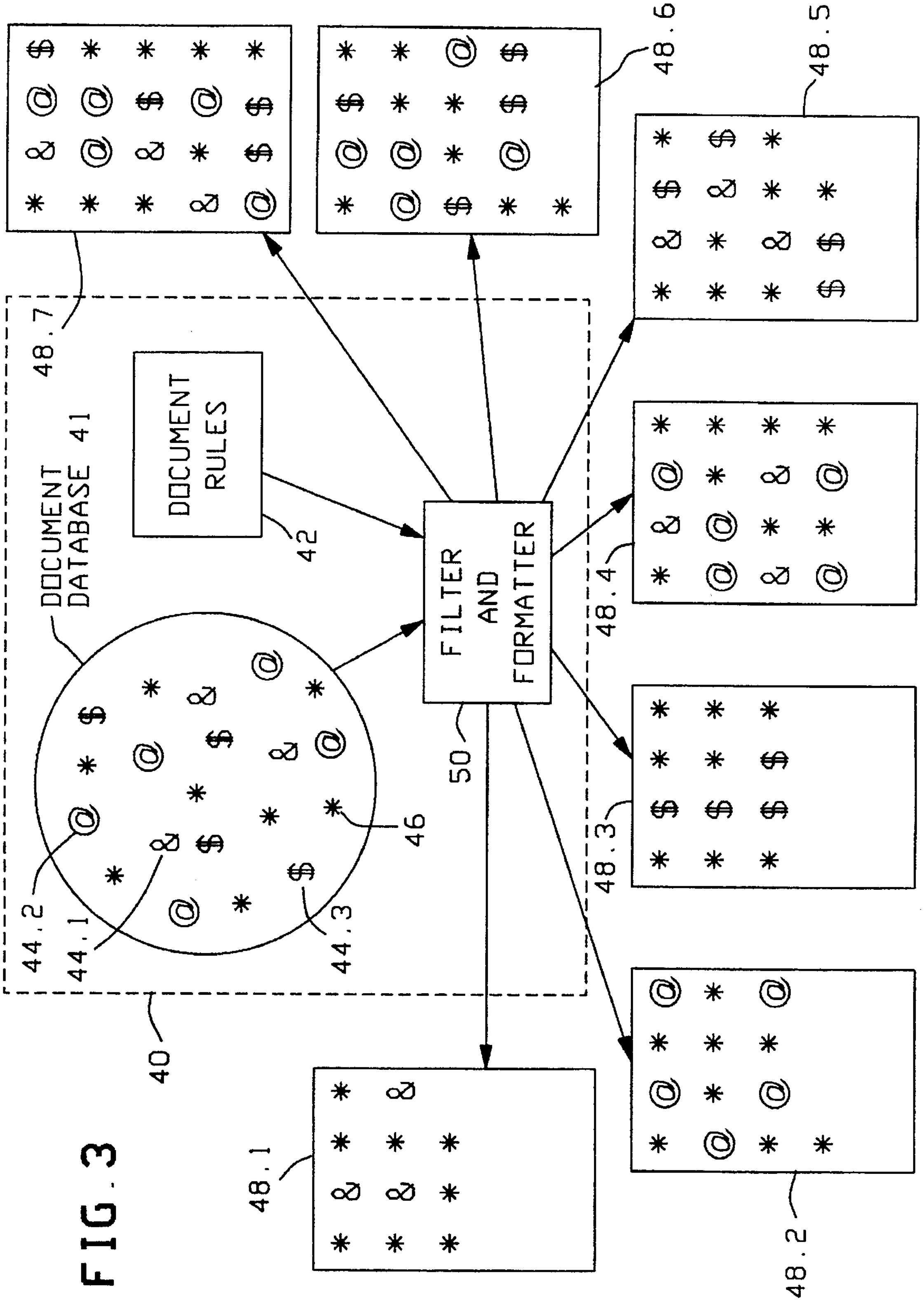
FIG. 3 is an information data model of a document generation system according to the present invention.

FIG. 3 illustrates the CDS document generation system, and its inputs and outputs, according to the CDS information data model. Document generation system 40 is composed of the document database 41, document rules 42, and the filter and formatter 50. Document generation system 40 generates one or more output documents 48.

In FIG. 3, encapsulated data elements are represented by symbols: The symbols @, &, and $ represent variation-specific data elements 44 and the symbol * represents common data elements 46, which are shared by all variations. (Note that the order of the symbols in the figure has no significance.) The following paragraphs describe each component of the model.

Document database: Document database 41 includes one or more variation-specific encapsulated data elements 44 and zero or more common encapsulated data elements 46.

Document rules: Document rules 42 dictate the relationship between all encapsulated data elements 44 and 46.

Filter and formatter: Filter and formatter 50 is processed against the document database 41. If desired, the author indicates which variation-specific elements 44 to exclude from the output document 48 and, working in conjunction with the document rules 42, filter and formatter 50 eliminates specified variation-specific elements 44, determines the validity of the remaining elements 44 and 46 and their relationships, and formats the resulting output document 48.

Output documents: Output documents 48 include common data elements 46 and one or more variation-specific data elements 44 as specified by the author. The system generates any combination of variation-specific documents, including a document for each single variation 48.1 through 48.3, documents containing combinations of two or more variations 48.4 through 48.6, or a document containing all variations 48.7.

By filtering document database 41 to eliminate variation-specific data elements, a document can be formed which contains only the desired variations. A document 48.1 can be created by eliminating all variation-specific data elements 44.2 and 44.3. Such a document would contain common information as defined by data elements 46 and variation-specific information as defined by variation-specific data elements 44.1. Similar documents 48.2 and 48.3 can be created by eliminating variation-specific data elements 44.1 and 44.3 (for document 48.2) or by eliminating variation-specific data elements 44.1 and 44.2 (for document 48.3). The result is a separate document for each variation.

In a similar fashion, combined documents 48.4 through 48.6 can be formed by eliminating variation-specific data elements 44.3, 44.2 and 44.1, respectively. Finally, a combined document 48.7 can be formed containing information for all variations. In one embodiment, information representing a variation-specific data element 44 is marked within the document so as to aid the reader in discerning variation-specific information. In one such embodiment, information associated with a particular variation is marked with a context aid such as a bracket to identify the variation to which it applies. Data elements which apply to all variations remain marked (i.e. receive no context aids).

In one embodiment, a combined document 48.4, 48.5, 48.6, or 48.7 is delivered in electronic form (such as CD-ROM) so that search and display software such as Windows Personal Librarian™ manufactured by Personal Library Software, Inc. of Rockville, Md. can be used to hide or display one or more variations. In an embodiment tailored for search and display software packages, users can electronically tailor their view of a document 48.4, 48.5, 48.6, or 48.7 to include only the information they want to see. A combined document 48.4, 48.5, 48.6, or 48.7 which is to be used with a particular search and display software package must be placed in a format used by that package. For instance, *PL-Admin Database Administration Manual* published November 1992 by Personal Library Software, Inc. describes the database markup required for display using Windows Personal Librarian™, the description of which is hereby incorporated by reference.

Figure 4:
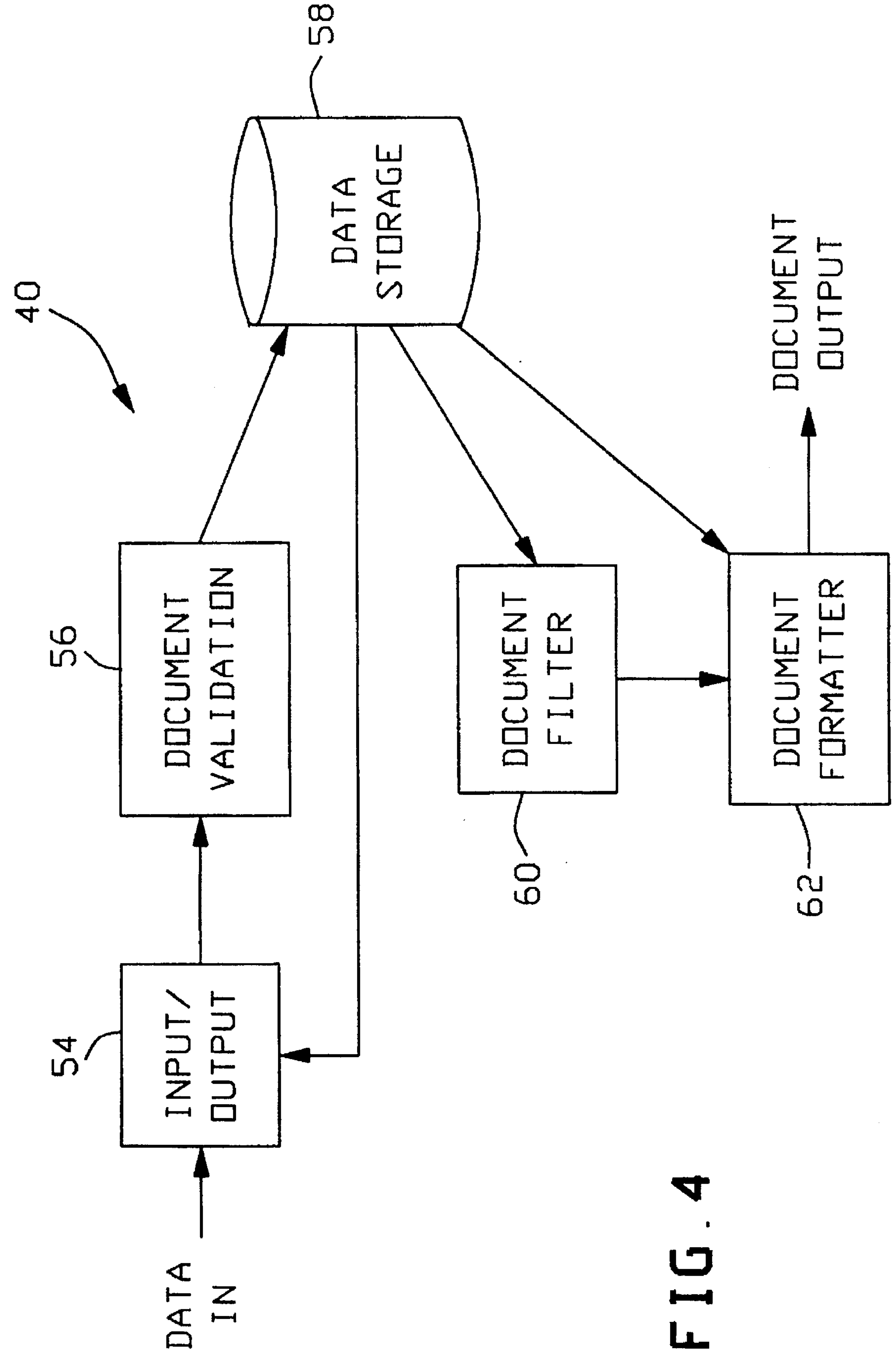
FIG. 4 is an information flow model of a document generation system according to the present invention.

Flow of information through a CDS document generation system 40 is shown in FIG. 4. The document generation system 40 includes an input/output device 54, document validation 56 used to validate document data entered at the input/output device 54, data storage 58 used to store the common document database 41, a document filter 60 used to suppress undesired variations in the document to be generated, and a document formatter 62 used to format the filtered output document.

A document entered at input/output device 54 is validated by document validation 56 and stored to data storage 58. The document can then be accessed by the author for further editing, can be filtered via document filter 60 to form a variation-specific document, or can be formatted via a document formatter 62. The input/output device 54 can be any device used to enter data.

Figure 5A:
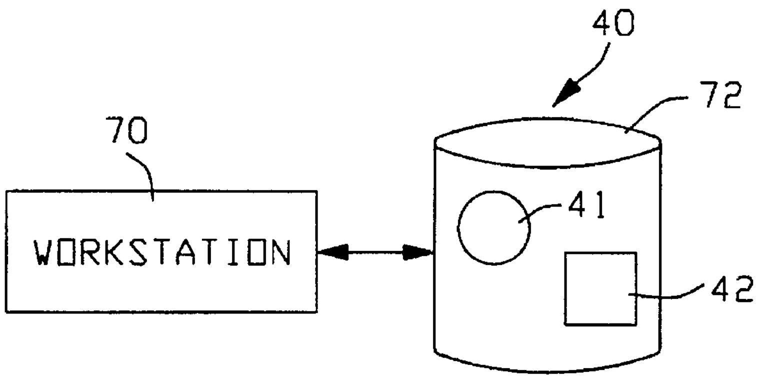
FIGS. 5*a* and 5*b* are functional block diagrams of two embodiments of the document generation system.

In one embodiment, shown in FIG. 5*a*, document generation system 40 includes a stand-alone workstation 70 connected to a data storage device 72 used to store document database 41 and document rules 42. In such an embodiment, the functions of input/output device 54, document validation 56, document filter 60 and document formatter 62 are performed by software executing on workstation 70.

Figure 5B:
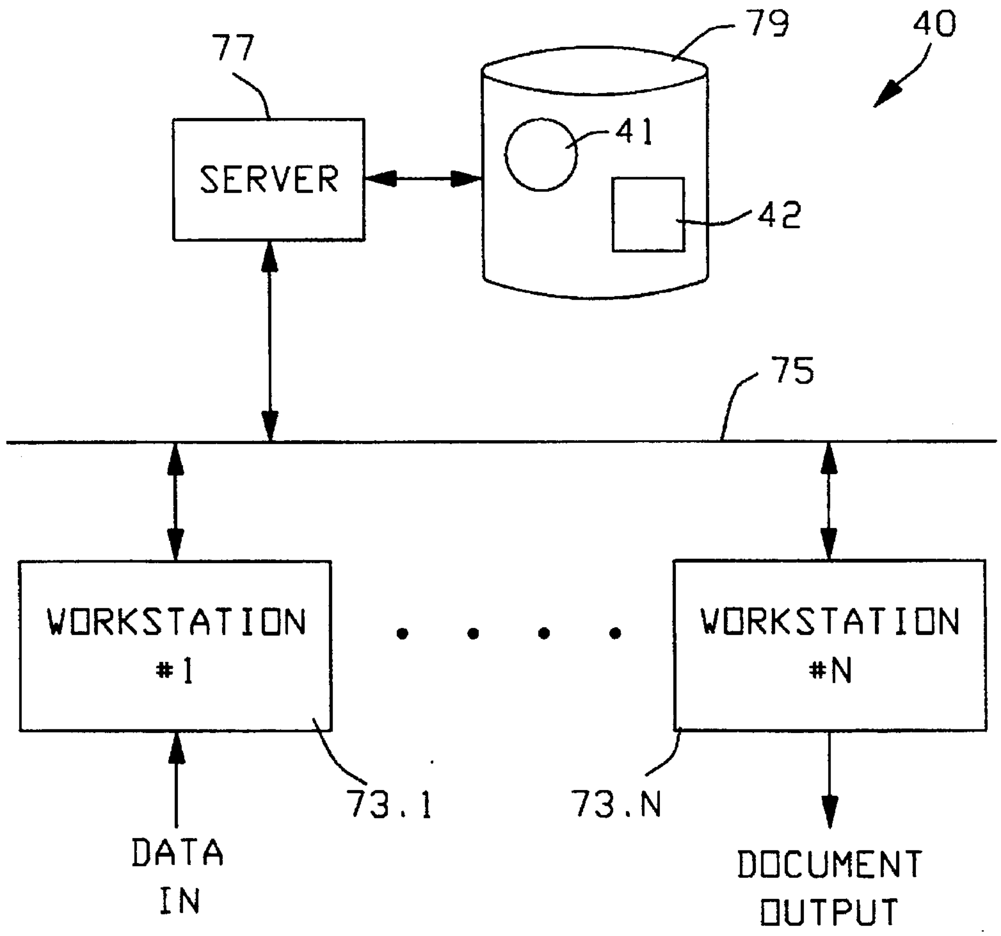

In another embodiment, shown in FIG. 5*b*, document generation system 40 includes a plurality of authoring workstations 73.1–73.N connected over a network 75 (such as a local area network or a public telecommunications network) to a file server 77. File server 77 is connected to a data storage device 79 which is used to store document database 41 and document rules 42. In such an embodiment, authoring software running on each of the workstations 73.1–73.N is used to create or modify document data and store that data under configuration control to document database 41. An object and configuration manager running on either workstations 73 or on file server 77 controls access to data elements stored in the dam storage device 79 in a manner known in the art.

In the embodiment shown in FIG. 5*b*, media formatter/search engine software running on one or more of the workstations 73 or on file server 77 is used to extract expressions of a document from data storage device 79. In one such embodiment, media formatter/search engine software is running on each of the authoring stations 73 so that it is easily accessible to each of the authors. In another such embodiment, media formatter/search engine is implemented in software on a particular workstation 73 or on file server 77.

In one embodiment, data elements stored in data storage device 72 or 79 are stored without formatting information. In such an embodiment, the media formatter/search software provides the formatting rules for each type of media supported by system 40.

The preferred embodiment of document generation system 40 is implemented as an enhanced SGML application. As noted previously, in standard SGML data elements such as text or graphics are encapsulated, tagged and stored in a source data file. Each element is clearly distinguished with beginning and ending tags and each tag is enclosed in greater than and less than symbols (<>); for example, a tag that specifies the beginning of a paragraph might look like <p>. The ending tags are preceded by a forward slash (/) character. Authors can use commercially available software tools to insert the required tags into the data file, or they can code the markup directly using an ASCII editor. An output document and its SGML data file are shown in FIGS. 6*a* and 6*b*, respectively.

The specific names used for the tags within an SGML data file and the hierarchical relationships between the various elements are based on a set of rules, called a Document Type Definition (DTD). The DTD is written according to a rigorous language defined by the ISO 8879 standard. The rules described by the DTD follow standards that have been defined for a particular type of information data element (e.g., a bullet list must contain more than one bullet, a second level heading must precede a third level heading). A portion of a sample DTD for technical documentation is shown in FIG. 7*a*.

The symbols used in a DTD have the following meanings:

| occurrence: | |
|---|---|
| + | required and repeatable; must occur one or more times |
| * | optional and repeatable; may occur one or more times |
| ? | optional; may occur once but not more than once |

| connectors: | |
|---|---|
| , | all elements must occur in specified sequence |
| \| | one and only one of the elements must occur |
| & | all elements must occur but in any order |

In the DTD shown in FIG. 7*a*, a guide element 80 defines the entire document. The guide element 80 includes a front matter element 82 (called "front") which is defined to include an optional running header 84, followed by a cover page 86, followed by a title page 88, followed by a disclaimer page 90, followed by a status page 92, followed by a preface 94, followed by a table of contents 96, followed by an optional table of FIGS. 98, followed by an optional table of tables 100, followed by an optional table of examples 102. Each element in the DTD is defined by one or more sub-elements. The sub-elements are in turn defined by elements further down the hierarchy (e.g. front matter element 82 is defined by elements including cover page 86; cover page 86 is itself defined by elements including, for instance, publication year 108).

Figure 7B:
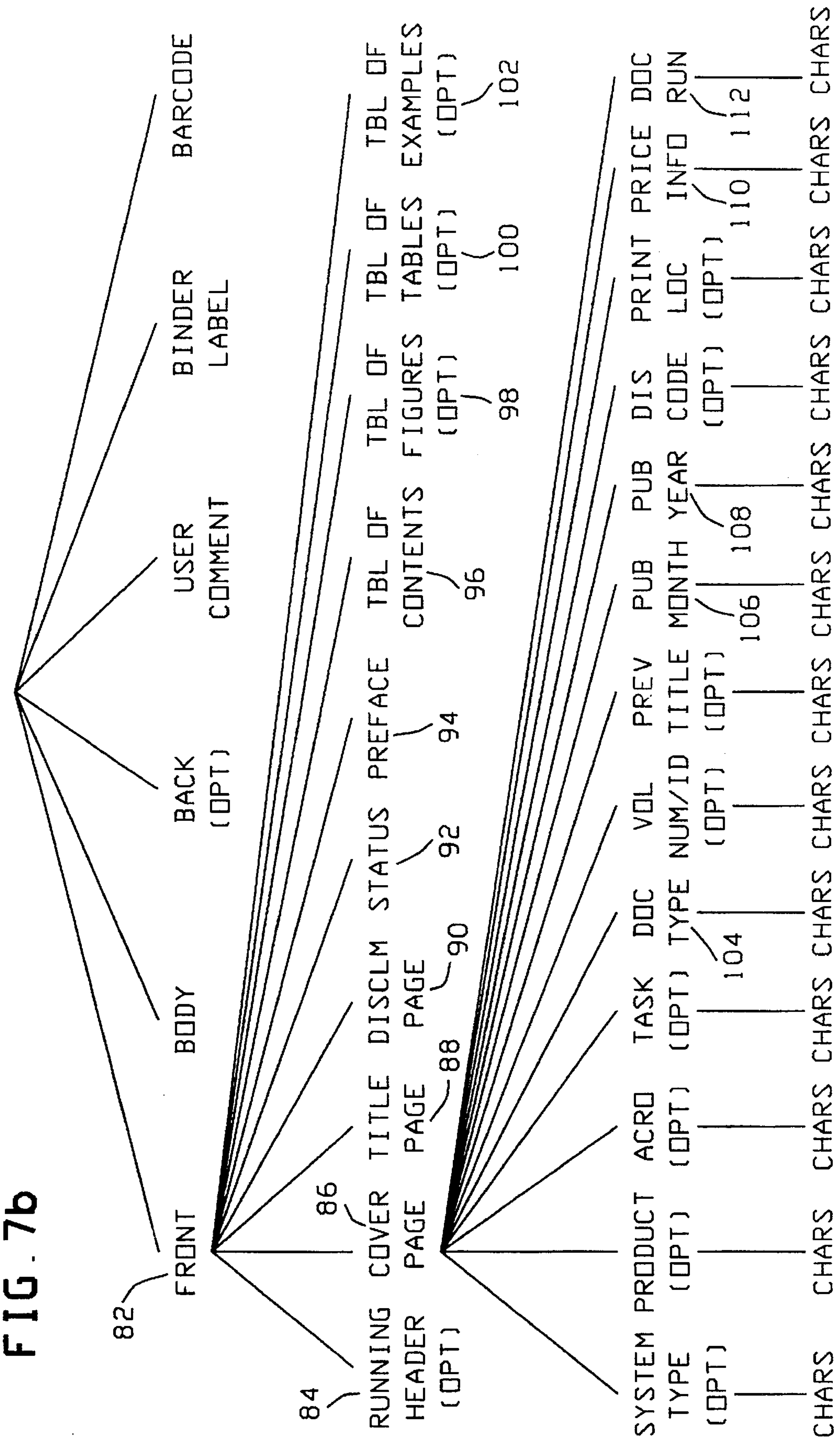

The hierarchical relationship between data elements defined by the DTD can be illustrated with a tree diagram such as that shown in FIG. 7*b*. In the tree diagram of FIG. 7*b*, cover page element 86 has been fully expanded. Cover page element 86 is contained within front matter 82 of the document ("front"), which is contained within the highest level of the tree (at guide 80). Cover page element 86 defines a series of data elements, including document type 104, publication month 106, publication year 108, price information 110, and document number 112. All the remaining data elements are optional. The elements defined within cover page element 86 must occur in the order specified in the tree from left to right. The lowest level of the tree indicates that all the elements of cover page are simply defined as characters.

Figure 8B:
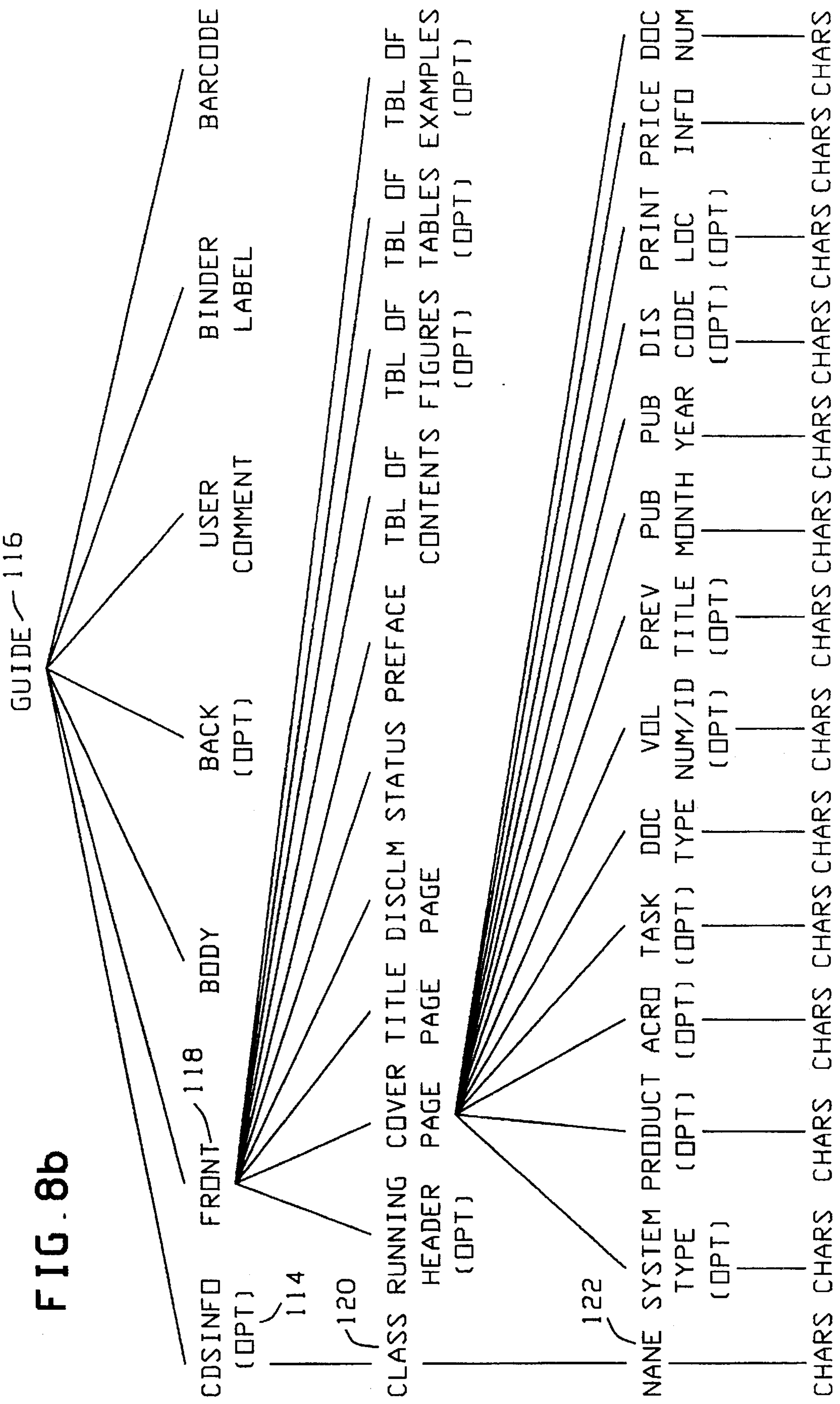
FIGS. 8*a* is a key to FIGS. 8*aa*–8*ab;*

In the preferred embodiment of document generation system 40, SGML has been enhanced to include a method of tagging data elements according to the variations to which they belong. To do this, configuration information is defined once at the beginning of the SGML data file. In one such embodiment, an optional element (called, for instance, "CDSINFO") is defined that identifies the specific CDS variations for that data file. An example of a representative DTD for optional element CDSINFO 114 is shown in FIG. 8*a* and a tree diagram corresponding to the DTD is shown in FIG. 8*b*. A sample SGML data file for the embodiment of CDSINFO element 114 illustrated in FIGS. 8*a* and 8*b* is shown in FIG. 8*c*.

In the example shown, CDSINFO element 114, which begins with the "<cdsinfo>" tag and ends with the "</cdsinfo>" tag, immediately follows GUIDE element 116 ("<guide>") and precedes FRONT element 118 ("<front>"). It should be apparent that other orderings could also be used and still fall within the scope of the present invention.

In the examples shown in FIGS. 8*a–c*, there is one class of variations defined for the document. As shown in FIG. 8*c*, the CLASS element 120 ("<class>") identifies "Platform" as the variation class. The "type" attribute on the class tag identifies how the variation should be handled by the output formatters. The <name> tags assigned to name element 122 define the variation names of information elements associated with particular platforms; they will be used throughout the document. This document contains four variations within the "Platform" class. The value of the cds attribute on the name tag identifies the internal identifier that is used as the cds attribute attached to a variation-specific data element 44 assigned to a particular variation of the particular class within the data file. The content of the <name> tag identifies the text used by document formatter 62 to identify variation-specific text or graphics.

From the information given in the example shown in FIGS. 8*a–c*, document filter 60 can determine that there is a single class ("Platform") containing four variations; the values of the cds attributes associated with those variations are: "plat-a", "plat-b", "plat-c", and "plat-d". Therefore, if the user specified that "plat-d" should be filtered (i.e., suppressed in the output document), this example would result in one of the variety of output documents shown in FIG. 3 (where plat-a, plat-b, and plat-c are represented by &, @, and $, respectively).

One example of a representative output document segment 124 generated by a DTD which includes the CDSINFO element 114 described above is shown in FIG. 9*a*. Document segment 124 includes a header 126, a heading checkbox 28, a block heading 130, a common paragraph 132 and three variation-specific paragraphs 134, 136, 138. Heading checkbox 128 is used to indicate which of the variations are pertinent to that particular segment 124. (In this example, the boxes associated with Platforms A, B and C are filled. This means that the entire section would be suppressed if the document was filtered to include information for only the Platform D variation.) Each variation-specific paragraph 134, 136, 38 is marked with a labeled margin bracket 140, 142 identifying the variation or variations with which it is associated. Other embodiments could use different presentation techniques to identify variation-specific information and still fall within the scope of the present invention.

One example of an SGML data file corresponding to the output document illustrated in FIG. 9*a* is shown in FIG. 9*b*. The cds attribute on the LEV1 element 144 ("<lev1>") indicates the entire element applies to "plat-a", "plat-b", and "plat-c", which correspond to Platform A, Platform B, and Platform C. The lack of a cds attribute on the first paragraph 146 ("<p>") defines that paragraph as information common to Platform A, Platform B, and Platform C (because the Document Type Definition treats the paragraph as an object encapsulated by the LEV1 element, which has attributes specifying those three platforms). The cds attribute on paragraph 148 designates the paragraph as specific to "plat-a", which corresponds to Platform A. Likewise, the cds attribute on paragraph 150 designates the paragraph as specific to "plat-b" which corresponds to Platform B. The cds attribute on paragraph 152 designates the paragraph as specific to "plat-a" and "plat-c", which correspond to Platform A and Platform C. Paragraphs 148, 150, 152 are, therefore, variation specific encapsulated data elements equivalent to elements 44 of FIG. 3.

In the embodiment illustrated through the example in FIG. 9*a*, the cds attribute on the LEVI element 144 caused a heading checkbox 128 to be displayed with filled (or checked) boxes preceding the "Platform A", "Platform B", and "Platform C" labels and an empty box preceding the "Platform D" label. In that same embodiment, the cds attributes on paragraphs 148 and 150 caused margin brackets 140 to be created in the output document labelled with "Platform A" and "Platform B", respectively. Likewise, the cds attribute on paragraph 152 caused margin bracket 142 to be created in the output document labelled with the labels "Platform A" and "Platform C".

FIGS. 10*a*, 10*b*, and 10*c* illustrate another example of a document source file implemented according to the present invention. This embodiment contains two classes of variations. FIG. 10*a* is an SGML source file 153. CLASS element 154 identifies "Platform" as one variation class. The Platform class contains three variations: Platform A, Platform B, and Platform C, which correspond to the cds attribute values "plat-a", "plat-b", and "plat-c", respectively. CLASS element 156 identifies "Audience" as a second class. The Audience class contains two variations: Novice and Expert, which correspond to the cds attribute values "novice " and "expert".

In the embodiment of the invention used in this example, the value defined for the type attribute results in specific actions by the output formatter. The type=1 attribute on CLASS element 154 indicates that the output formatters will include the variations in this class within the heading checkboxes and margin brackets in the output document. The type=2 attribute on CLASS element 156 indicates that the variations in this platform will only be filtered, i.e., the output formatters will not include these variations in the heading checkboxes and margin brackets in the output document.

FIG. 10*b* is an example of an output document generated from the SGML source file 153 illustrated in FIG. 10*a*. This output document has been "filtered" for the novice audience variation. Paragraph 160 is included in the output document because it was encapsulated within a variation-specific data element 158 having cds attributes which included the variation name "novice". Likewise, paragraph 164 is included in the output document because the value of the cds attribute of data element 162 is "novice". Paragraph 168 is not included in the output document because the value of the cds attribute of data element 166 is "expert".

Similarly, FIG. 10*c* is another embodiment of an output document generated from the SGML source file illustrated in FIG. 10*a*. This output document has been "filtered" for the expert audience variation. Paragraph 160 is included in the output document because one of the variation names assigned to element 158 is "expert". Paragraph 164 is not included in the output document because the only variation name assigned to it is "novice". Paragraph 168 is included in the output document because the variation name assigned to it is "expert".

Although FIGS. 10*a*, 10*b*, and 10*c* show the variations for one class (audience) nested within an element with attributes for another class (platform), it should be noted that variations from one class can be intermixed with variations of other classes and nesting can occur in any order.

Beyond the normal tasks required to implement an SGML application, there are three basic tasks required to implement the SGML application described above. A software implemented embodiment of the document generation system according to the present invention is described next. In one such embodiment, document generation system 40 is implemented in the C programming language on a personal computer or workstation using Version 3.1 of the Borland C++ Compiler. Other platforms, compilers and languages could be used and the resulting system would still fall within the scope of the present invention.

In one such embodiment, document validation software performs the document validation function of document validation 56 in FIG. 4. Likewise, filtering software and formatting software perform the functions of document filter 60 and document formatter, respectively. (As can be seen in FIG. 4, the output may or may not be filtered.)

For example, an author inputs (at input/output device 54) an SGML source file with one class of variations having names A, B and C. That source file passes through document validation 56. The result is a validated SGML source file having variations A, B and C. That result is stored in data storage 58.

When an output document is to be produced for variations A and B, the document author takes the validated SGML source file from data storage 58 and runs it through the document filter 60. Document filter 60 removes all variation-specific data elements that apply to only variation C. The resulting filtered data file is then formatted via document formatter 62 for the desired output medium. If the user wants to generate the complete document, document filter is bypassed and the source file is instead retrieved and formatted by document formatter 62.

Figure 11A:
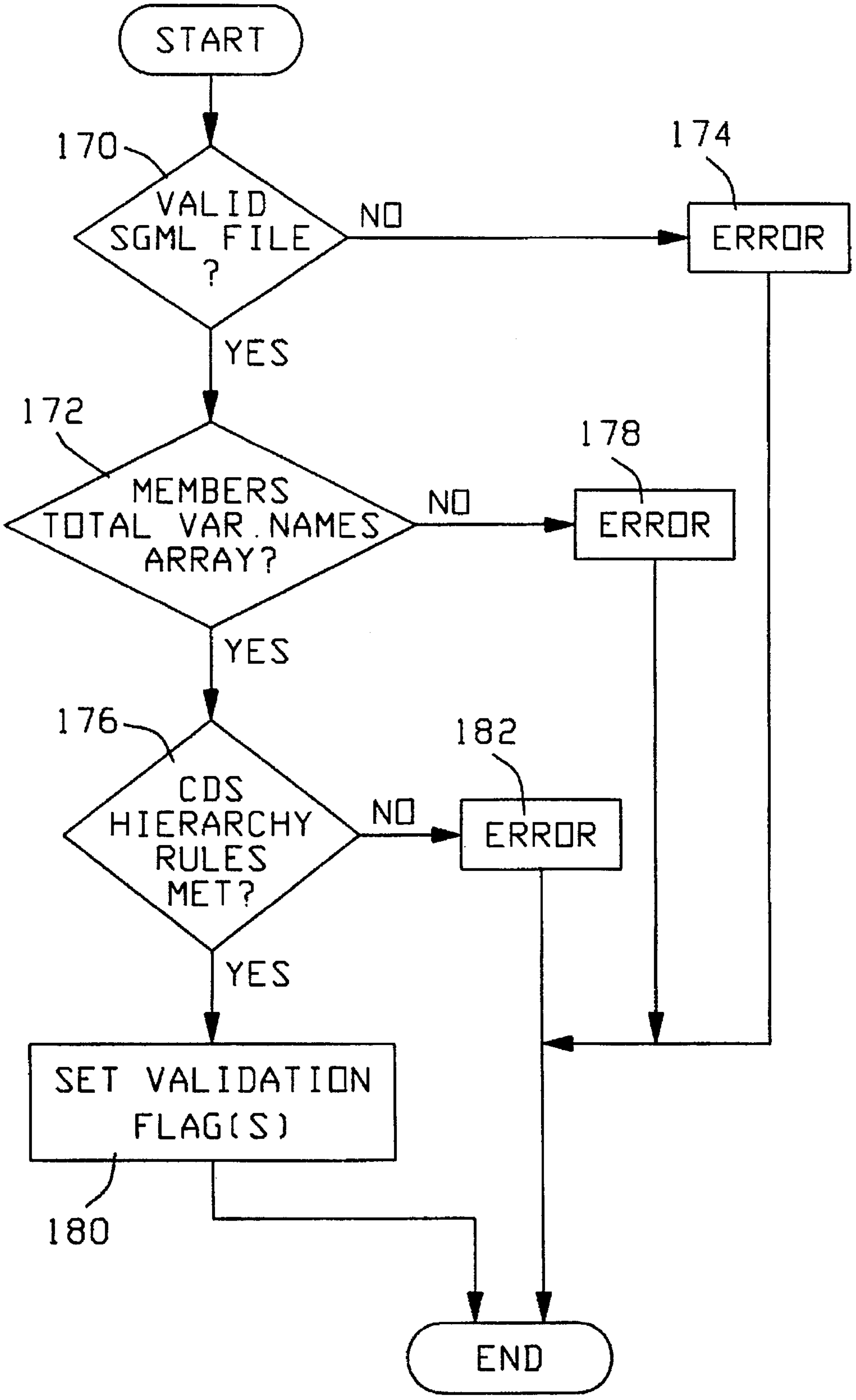
FIGS. 11*a*–*c* the steps executed by a computer in validating an SGML data file that uses CDS.
Figure 11B:
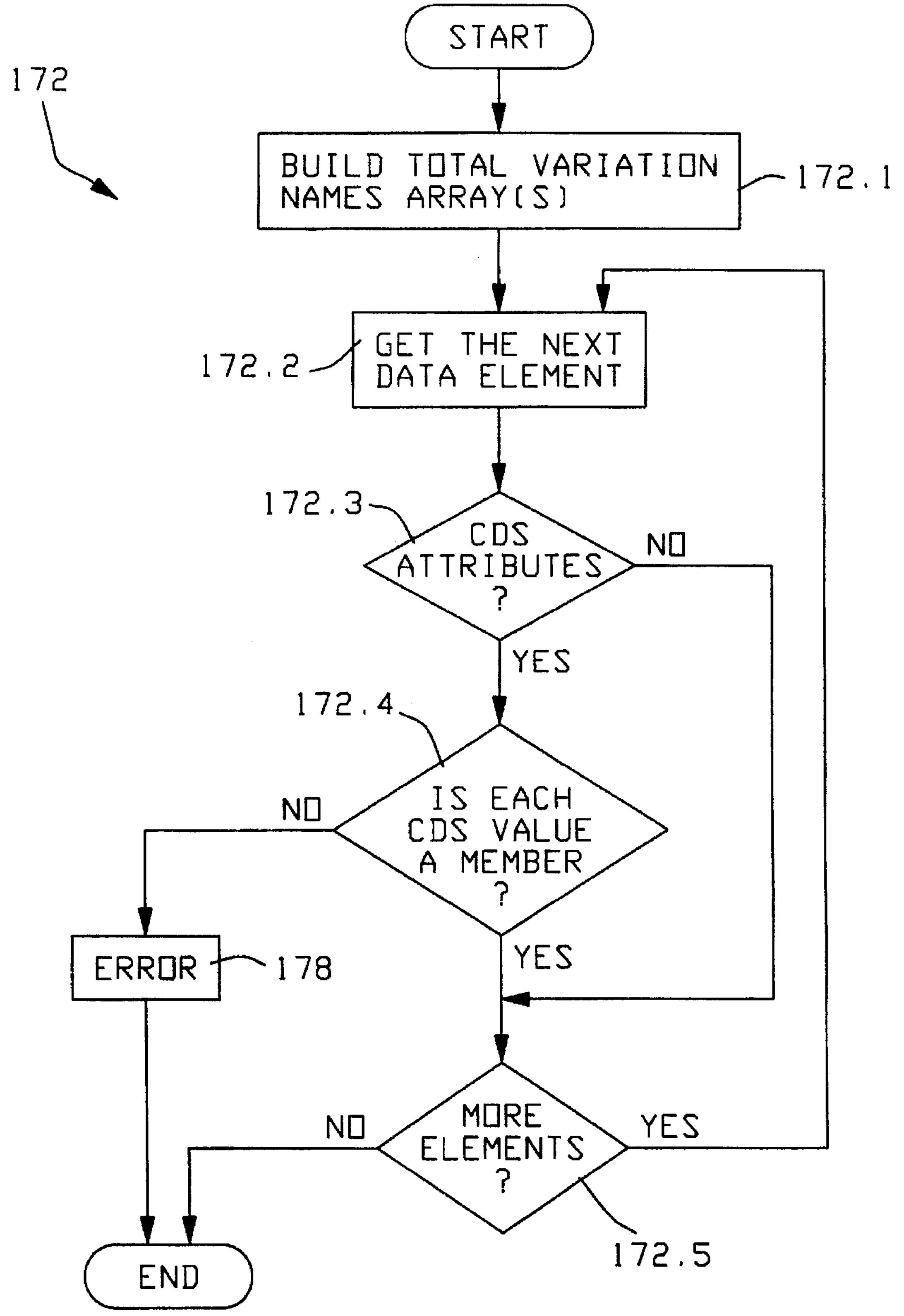
Figure 11C:
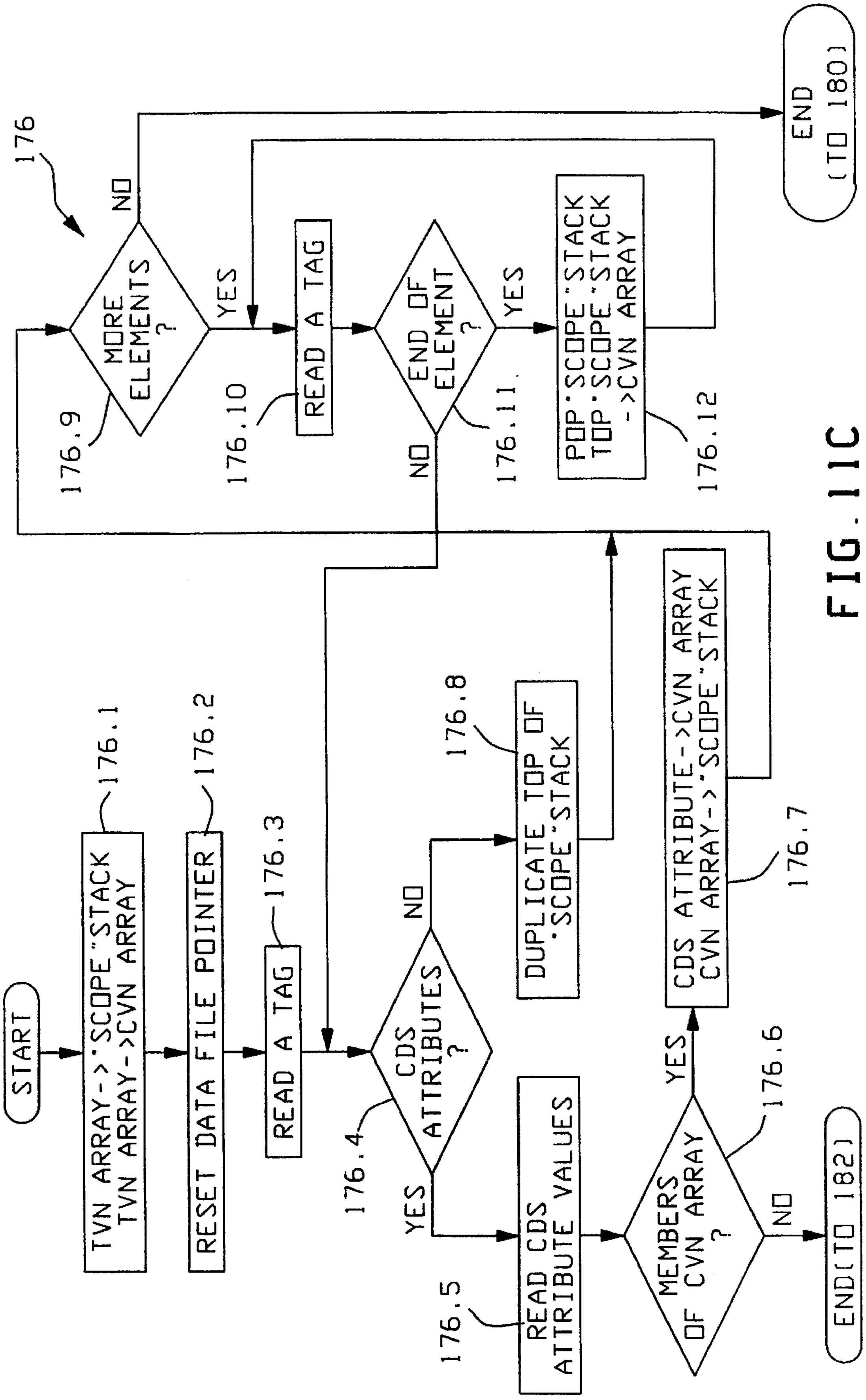

In FIG. 4, document validation 56 validates a document by determining if the grammar of a CDS Document Type Definition and hierarchy rules have been followed. The steps executed by a computer in validating the SGML data file for conformance to the CDS DTD and hierarchy rules are shown in FIGS. 11*a–c*. As can be seen in FIG. 11*a*, at 170 the data file is checked for compliance with the SGML standard. If no deviation is detected, control moves to 172. If, however, an anomaly is detected, an error message is generated at 174 and the validation program exits.

At 172, a check is made to ensure that all variation names used on the elements within this data file are members of the variations defined for this document. Specifically, as can be seen in FIG. 11*b*, the following steps are performed within 172:

172.1 The <cdsinfo> element 114 is read from the SGML source file. Each <class> element 120 is read from the <cdsinfo> dement and from each <class> element 120 each <name> element 122 is read. An array is created and populated with the <name> elements 122; this array is referred to as the "total variation names" array. This array comprises the set of allowed cds attribute values for elements within the document database. If there are multiple <class> elements, there is a separate "total variation names" army for each <class> element.

172.2 The next data dement is read from the data file.

172.3 The data element tag is parsed to determine if the dement includes any cds attribute values. If it does, each value is read.

172.4 Each cds attribute value of the data element is compared against all the members of the "total variation names" array (or arrays, for multiple classes). If a cds attribute value for the data element is a member of the "total variation names" array, control moves to step 172.5. If it is not a member, an error is generated at 178 and the validation program exits.

172.5 The data file is checked to see if there are any more data elements. If so, control moves to step 172.2. If not, control moves to 176.

Returning to FIG. 11*a*, at 176 the data file is checked for compliance with the CDS hierarchy rules. The CDS hierarchy rules are:

The highest level dam element (<guide>) implicitly contains the set of cds variation names defined by the "total variation names" array.

Any data element can contain a set or subset of cds variation names equal to, but not greater than, the set contained by a previous higher data element in the hierarchy defined by the SGML Document Type Definition.

Specifically, as can be seen in FIG. 11*c*, the following steps are performed within 176:

176.1 The "total variation names" array (from 172.1) is copied onto a "scope" stack and also to the "current variation names" array. (The "scope" stack is a stack of variation names arrays.) If there are multiple classes, there is a scope stack for each class.

176.2 The data file pointer for reading the data file is reset to the end of the <cdsinfo> element within the data file.

176.3 A tag is read from the data file.

176.4 The tag is parsed to determine if the element includes any cds attribute values. If it does, control moves to 176.5. If it does not, control moves to 176.8.

176.5 Each cds attribute value is read and control moves to 176.6.

176.6 Each cds attribute of the tag is compared against the "current variation names" array. If all cds attribute values for the tag are members of the "current variation names" array, control moves to step 176.7. If any cds attribute values are not members, an error is generated at 182 and the validation program exits.

176.7 A new entry on the top of the "scope" stack is created by erasing the contents of the "current variation names" array, copying the set of cds attribute values for the data element associated with the tag into the "current variation names" array and placing a copy of the updated "current variation names" array onto the top of the "scope" stack. Control then moves to 176.9.

176.8 The current entry at the top of the "scope" stack is duplicated and placed on top of the "scope" stack, and then control moves to 176.9.

176.9 The data file is checked to see if there any more data elements. If so, control moves to step 176.10. If not, control moves to 180.

176.10 The next tag from the data file is read.

176.11 If the tag indicates the end of an SGML data dement, the top of the "scope" stack is erased at 176.12 and the existing entry now positioned at the top of the "scope" stack is copied into the "current variation names" array. Control then moves to 176.10. If the tag does not indicate the end of an SGML data element (i.e. it indicates the beginning of an element), control moves to 176.4.

Returning to FIG. 11*a*, at 180 the file is marked to indicate that it is a valid SGML source file (conforming to the Document Type Definition) and that it is a valid CDS source file (conforming to the CDS hierarchy rules.) This flag will be used by document formatter 62. The program then exits normally.

In FIG. 4, document filter 60 filters the document database 41 stored in data storage 58 in order to eliminate variation-specific data elements 44 associated with undesired variations. The steps executed by a computer in filtering an SGML source file conforming to a CDS DTD and hierarchy rules are shown in FIGS. 12*a* and 12*b*.

Figure 12A:
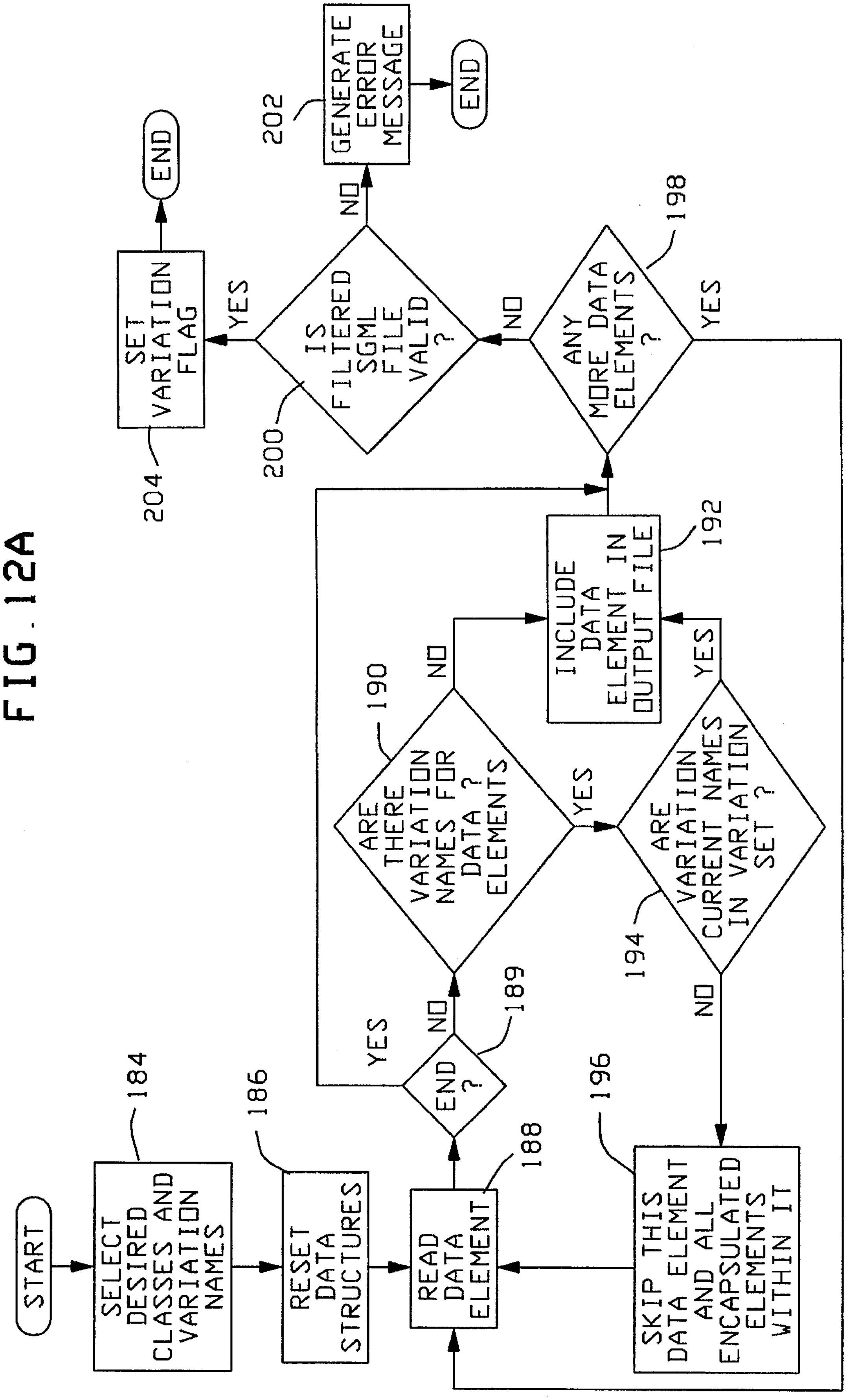
FIGS. 12*a* and 12*b* show the steps executed by a computer in filtering an SGML data file that uses CDS.
Figure 12B:
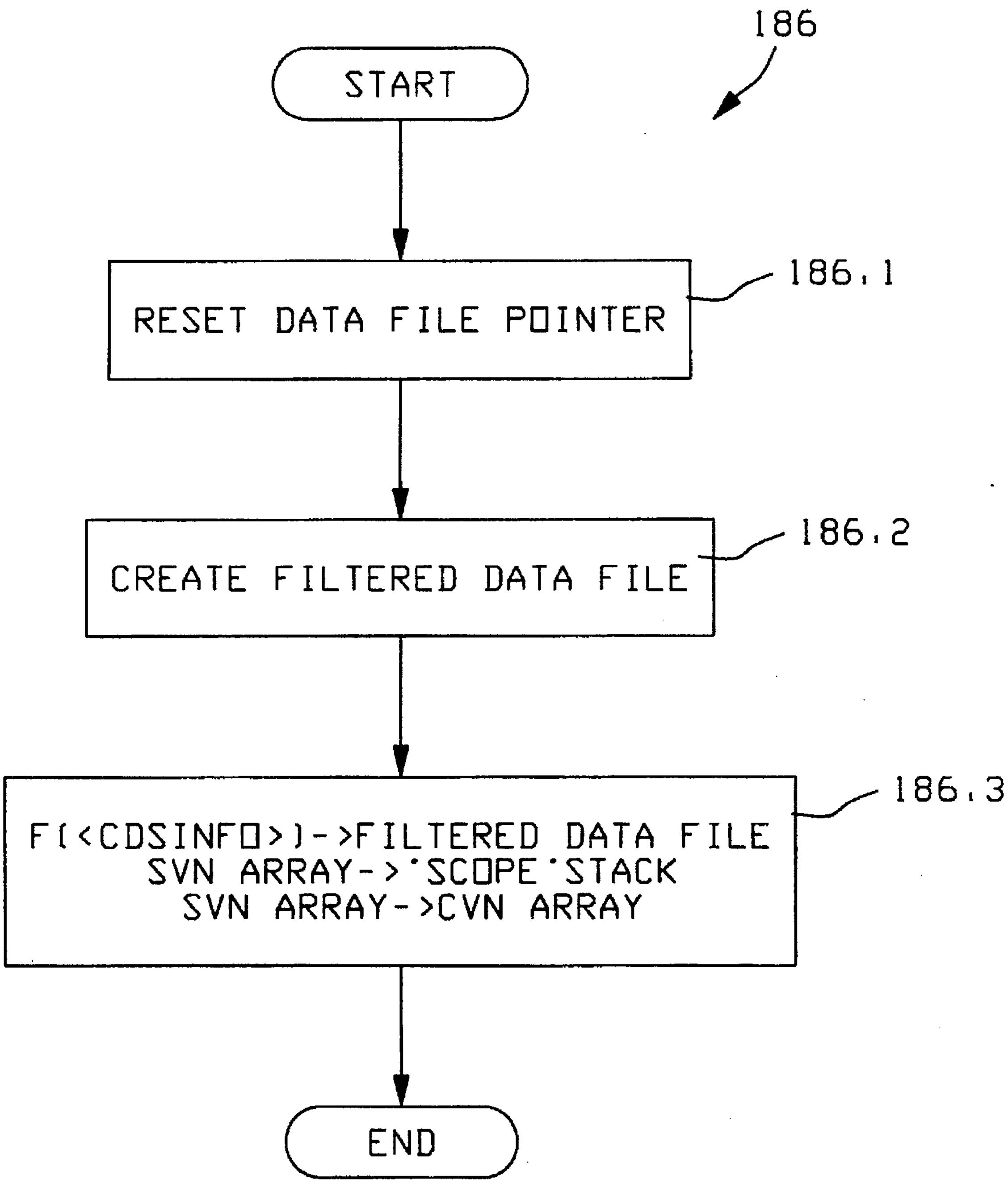

As can be seen in FIG. 12*a*, at 184 the variation names for the desired output are selected from the set of total variation names. If there are multiple class elements, the variation names may be from one or more classes. The selected variation names identify the desired portions of the document to be generated. The selected variations may be retrieved from memory or entered by the document author via an input screen. The process of selection populates an array of variation names called the "selected variation names" array.

At 186, the required data structures are reset for processing the data file. Specifically, as can be seen in FIG. 12*b*, the following steps are performed within 186:

186.1 The data file pointer for reading the source file is reset to the end of the <cdsinfo> element within the data file.

186.2 An output file is created for the results of the filtering process. This is the "filtered source file."

186.3 The components of the <cdsinfo> dement of the source file that match the "selected variation names" array are copied to the filtered source file. This modification, upon being written to the filtered source file, will reflect the fact that certain variations will not be contained within the filtered source file. The "selected variation names" array (from 110) is copied onto a "scope" stack and also to the "current variation names" array. (The "scope" stack is a stack of variation names arrays.) If there are multiple classes, there is a "scope" stack for each class.

Returning to FIG. 12*a*, at 188 a tag is read into memory from the validated SGML source file and control moves to 189. If, at 189, the tag indicates the end of an SGML data element, the top of the scope stack is erased and the existing entry now positioned at the top of the "scope" stack is copied into the "current variation names" array. Control then moves to 198. If at 189 the tag indicates the beginning of an SGML data element, control moves to 190.

At 190, the data element tag is parsed to determine if the element includes any cds attribute values. If it does, each value is read into the "current variation names" array in memory, and control moves to 194. If there are no cds attribute values, it is a common data element. In this case, the current entry at the top of the "scope" stack is duplicated and copied on top of the "scope" stack, and then control moves to 192.

At 192, the tag and its data content is appended to a current filtered data file. Control then moves to 198.

At 194, each value for the cds attribute of the tag that has been read into the "current variation names" array is compared against all the members of the "selected variation names" array (or arrays, for multiple classes). If any value from the "current variation names" array of the data element is a member of the "selected variation names" array, the data element is to be included in the filtered data file. In this case, a new entry on top of the "scope" stack is created by erasing the contents of the "current variation names" array, copying the set of cds attribute values for the tag into the "current variation names" array, and placing a copy of the updated "current variation names" array onto the top of the "scope" stack. Control then moves to 192. It is possible for members of the "current variation names" array to be in the "total variation names" array but not in the "selected variation names" array. This does not prohibit the data element from being included in the filtered data file, as long as at least one member of the "current variations names" array and the "selected variations names" array is the same. For example:

Given the following:

Total variation set containing plat-a, plat-b, plat-c, and plat-d.

Selected variation set containing plat-a and plat-c.

A data element having a current variation set of plat-a and plat-d would be included in the filtered data file.

A data element having a current variation set of plat-b would be excluded from the filtered data file.

If no members match, the data element is to be excluded from the filtered data file, and control moves to 196.

At 196, the method of reading the data file is directed to skip the data element and all data elements hierarchically below (encapsulated within) the element. Control then moves to 188.

At 198, a check is made to determine whether there are remaining elements in the data file to be filtered. If so, control moves to 188. If there are no more data elements, control moves to 200.

At 200, the filtered source file is processed according to the established SGML validation rules described for 170 in FIG. 11*a*. This ensures that the elimination of the omitted data elements does not violate any SGML rules as defined by the Document Type Definition. If the file is valid, control moves to 204. If the file is not valid, control moves to 202, where an error message is generated and the program exits.

At 204, the file is marked to indicate that it is a valid SGML source file (conforming to the Document Type Definition) and that it is a valid CDS source file (conforming to the CDS hierarchy rules). This flag will be used by document formatter 62. The program then exits normally.

In FIG. 4, document formatter 62 formats the document. The input document may have been filtered by document filter 60 or not filtered (obtained directly from data storage 58). The steps executed by a computer in formatting a validated SGML data file conforming to a CDS DTD and hierarchy rules are shown in FIGS. 13*a–c*.

Figure 13A:
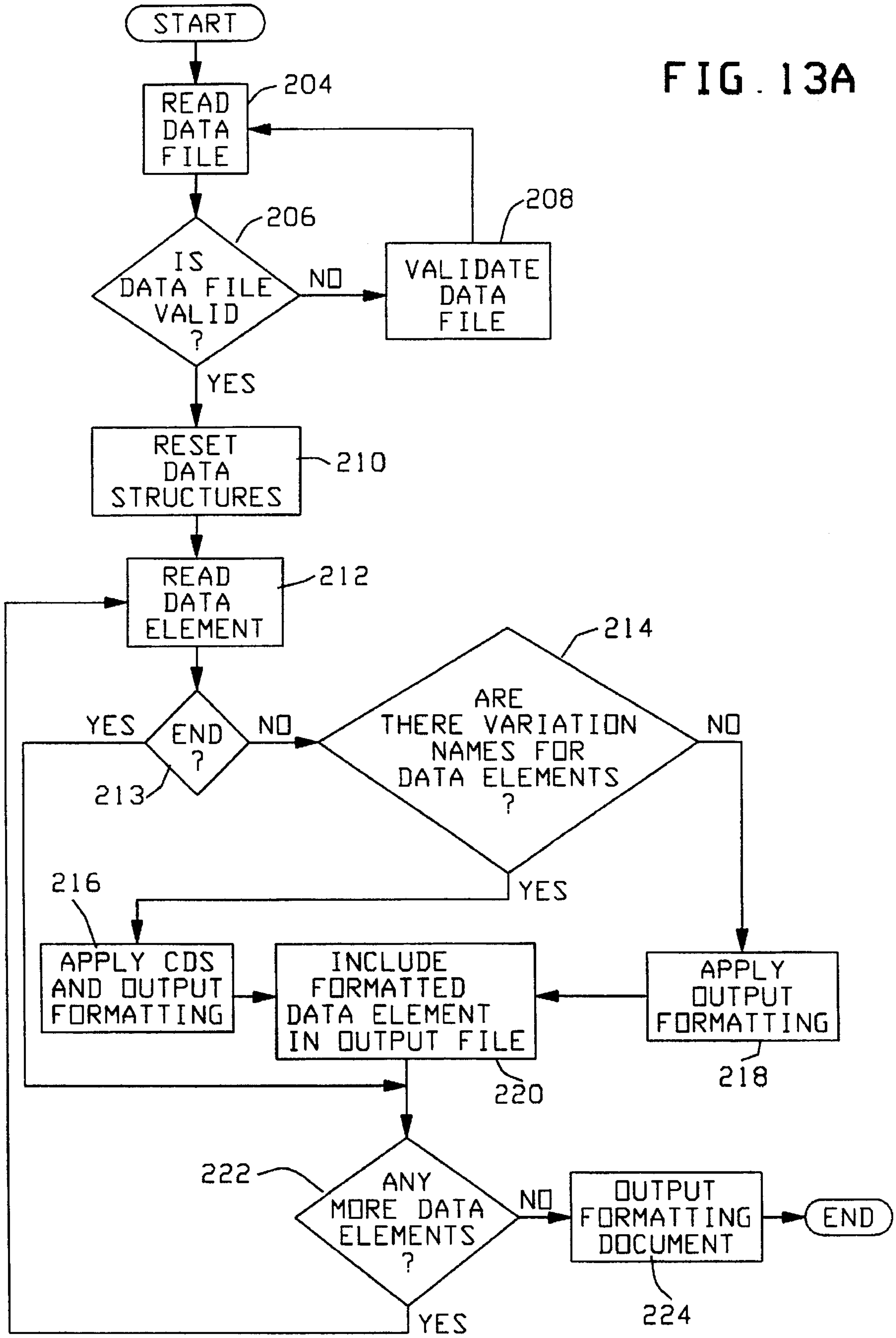
FIGS. 13*a*–*c* show the steps executed by a computer in formatting a filtered SGML data file that uses CDS.
Figure 13B:
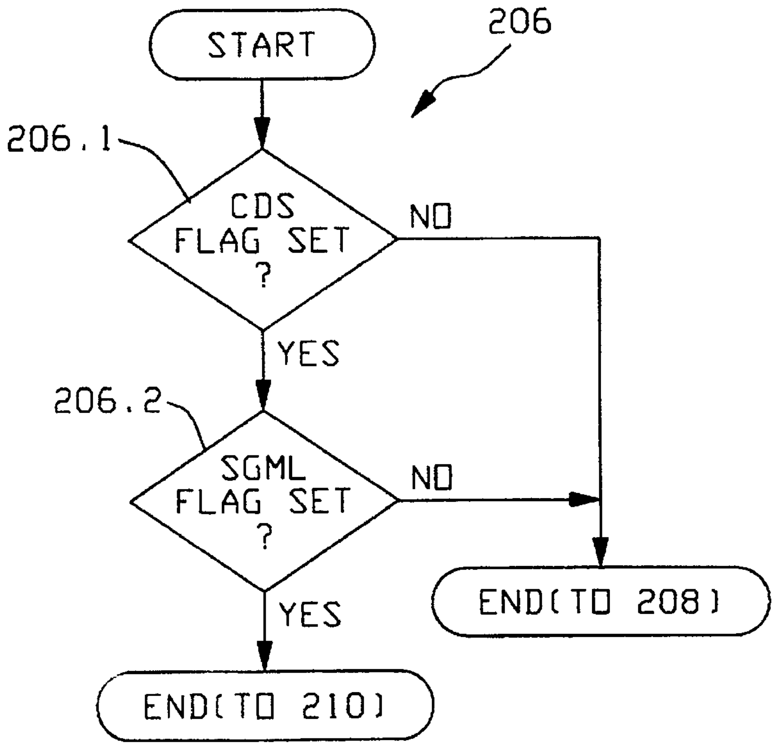
Figure 13C:
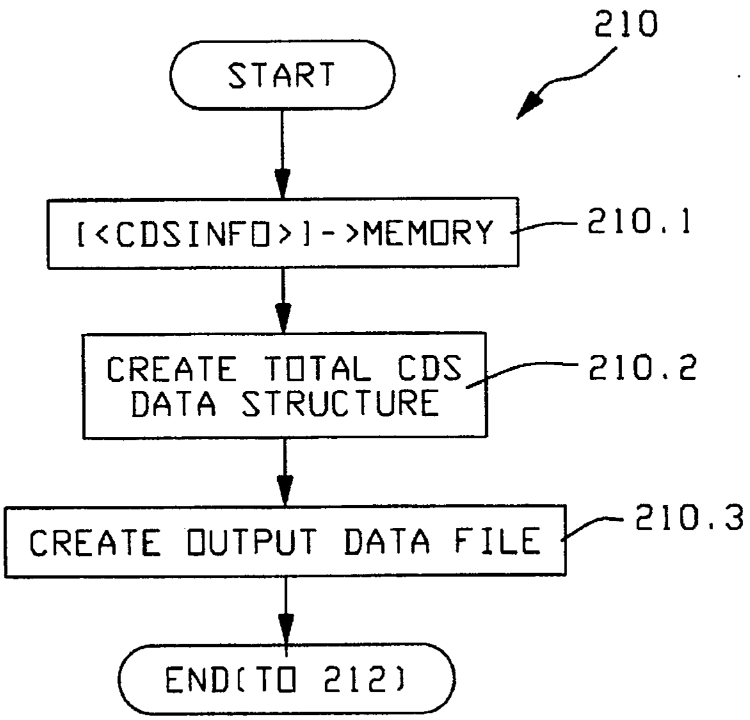

As can be seen in FIG. 13*a*, at 204 the SGML source file is read into memory.

At 206, the data file is checked for compliance with the SGML DTD and CDS hierarchy rules. Specifically, as can be seen in FIG. 13*b*, the following steps are performed within 206:

206.1 The data file is checked to determine if the CDS flag is set. (If the CDS flag is set, the formatter can apply CDS formatting rules.) If the CDS flag is set, control moves to 206.2. Otherwise, control moves to 208.

206.2 The data file is checked to determine if the SGML validation flag is set. If the SGML validation flag is set, control moves to 210. If the SGML validation flag is not set, control moves to 208.

Returning to FIG. 13*a*, at 208 the data file is validated according to the process shown in FIG. 11*a*. Control then moves to 204.

At 210, the required data structures are reset for processing the data file. Specifically, as can be seen in FIG. 13*c*, the following steps are performed within 210:

210.1 The elements within the <cdsinfo> element are read into memory.

210.2 From each <class> element each <name> element is read, and from the set of <name> elements an array is created of the defined variation names. This array comprises the set of allowed cds attribute values for elements within the document database. This is the "total variation names" array. If there are multiple <class> elements, there is a separate "total variation names" array for each <class> element. A data structure is created for each member in the "total variation names" array. This data structure contains fields for each member of the "total variation names" array. These fields contain information about the variation class, variation type, the internal cds attribute value, and the label text that will identify the variation in the output document. This data structure, together with the "total variations names" array, is referred to as the "total CDS data structure." The "total CDS data structure" is copied onto a "scope" stack and also to the "current CDS data structure."

210.3 An output file is created for the results of the formatting process. This is the "output data file."

Returning to FIG. 13*a*, at 212 a tag is read from the data file. If, at 213, the tag indicates the end of an SGML data element, the top of the "scope" stack is erased and the existing entry now positioned at the top of the "scope" stack is copied into the "current CDS data structure." Control then moves to 222. If at 213 the tag indicates the beginning of an SGML data element, control moves to 214.

At 214, the tag is parsed to determine if the element includes any cds attribute values. If there are cds attribute values, each value is read into the "current variation names" array. The "total CDS data structure" is copied to a new location in memory and matched with the members of the "current variation names" army to create the "current CDS data structure." Control then moves to 216. If the tag has no cds attribute values, the current entry at the top of the "scope" stack is duplicated and copied on top of the scope stack. Control then moves to 218.

At 216, the document formatter processes the data element (the tag and its data content), applying formatting sequences for data elements having one or more variation names. It does this by reading fields of the "current CDS data structure" to determine what type of formatting treatment is needed for the data element. (For example, in one embodiment, heading checkboxes identify variations at section and subsection heading levels, while margin brackets surround data elements pertaining to a specific variation or set of variations. In another embodiment, each variation is identified with a different color.) Formatting rules for the desired output medium are also applied. Then control moves to 220.

At 218, the document formatter processes the data element, applying formatting sequences for common data elements. Formatting rules for the desired output medium are also applied. Then control moves to 220.

At 220, the formatted data element is appended to the "output data file". Control then moves to 222.

At 222, a check is made to determine whether there are remaining elements in the data file to be filtered. If so, control moves to 212. If there is no more data elements, control moves to 224.

At 224, the document formatter completes the output document. The program then exits normally.

The CDS Authoring Methodology.

The CDS authoring methodology is founded on a set of five principles, which identify the main focus items for authors. The first principle is the principle of efficient authoring. According to this principle, authors should write both common information and variation-specific information once in a single-source document database, rather than duplicating or rewriting. Authors should also maintain a single-source document database for future revisions, rather than incorporating changes in multiple databases to keep them consistent.

The second principle is the principle of balanced audience needs. According to this principle, authors should consider what is most useful for end users who want to compare information, as well as end users who want to see only one variation. Where applicable, authors should use CDS to give end users the ability to tailor the documentation to their needs.

The third principle is the principle of electronic media focus. According to this principle, authors should focus on electronic media, in addition to paper media, by designing information for viewing on a screen, considering the ramifications of user-configured views (such as the effect of suppressing a variation), and using the technology to provide end users with value-added documentation features (such as the ability to suppress variations). In particular, authors would be careful to structure their documents so that the document is logically consistent when a variation is removed or suppressed.

The fourth principle is the principle of clarity and accuracy. According to this principle, authors must always provide clear, unambiguous, and technically accurate information. When considering CDS and its effect on the documentation, authors must never choose aesthetics over clarity and accuracy.

The fifth principle is the principle of comparison assistance. According to this principle, authors should provide visual assistance for end users who want to compare variations of a document. Authors do this by including information about all variations in the same document and by clearly differentiating variation-specific information.

The CDS authoring methodology also includes a nine-step general process used to ensure document consistency. The process is as follows:

1. Choose some information to prototype, such as certain topics or sections.
2. Identify and categorize the variation differences.
3. Have the differences reviewed by subject matter experts.
4. Combine and tag the information in the database.
5. Verify the combined and variation-specific versions of the document.
6. Have the CDS tagged information reviewed by subject matter experts.
7. Get user feedback.
8. Repeat the process until the entire document is complete.
9. Track results of the process and additional feedback.

The document generation system according to the present invention can be used advantageously by a number of organizations. For instance, organizations which develop user documentation for software products that have multiple implementations (e.g. run on multiple hardware platforms, have multiple graphical user interfaces, or have extensions to an industry standard) can simplify document development and maintenance. Similarly, companies which create owner's manuals for products that have more than one model can use the method to simplify documentation requirements. Anyone who develops documents for products or concepts that have different variations will find the CDS approach useful.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method for creating a plurality of versions of custom documents from a document source file, comprising the steps of:

defining a source file having a plurality of encapsulated data elements, wherein each encapsulated data element includes document information including text or graphics, wherein the plurality of encapsulated data elements includes a plurality of first encapsulated data elements and a plurality of second encapsulated data elements;

defining a first class, wherein the first class includes a plurality of first class variation names and wherein the plurality of first class variation names includes a first and a second variation name;

tagging the plurality of first encapsulated data elements with the first variation name in the first class;

tagging the plurality of second encapsulated data elements with the second variation name in the first class;

selecting encapsulated data elements from the plurality of encapsulated data elements wherein the step of selecting includes the step of choosing a set of variation names including the first variation name; and filtering the source file with the set of variation names, wherein the step of filtering comprises forming a filtered source file comprising the selected encapsulated data elements.

2. The method according to claim 1 wherein the step of selecting further comprises the step of adding the second variation name to the set of variation names.

3. The method according to claim 2 wherein the plurality of encapsulated data elements includes a plurality of common encapsulated data elements and wherein the step of forming the filtered source file includes the step of placing the plurality of common encapsulated data elements into the filtered source file.

4. The method according to claim 1 wherein the method further comprises the step of producing a custom document output from the filtered source file.

5. The method according to claim 4 wherein the step of producing a custom document output comprises the steps of:

formatting the filtered source file to produce an electronic document which can be read on a display device; and storing the electronic document in a machine-readable format such that the electronic document can be searched and displayed via search and display software.

6. The method according to claim 1 wherein the method further comprises the steps of:

providing a second class, wherein the second class includes a plurality of second class variation names and wherein the plurality of second class variation names includes a third variation name; and tagging one of the plurality of encapsulated data elements with the third variation name; and wherein the step of choosing a set of variation names comprises the steps of:

selecting a first class variation name;

selecting a second class variation name; and adding the selected variation names to the set of variation names.

7. The method according to claim 6 wherein the encapsulated data element tagged with the third variation name is one of the plurality of first encapsulated data elements.

8. The method according to claim 6 wherein the plurality of encapsulated data elements includes a plurality of common encapsulated data elements and wherein the step of forming the filtered source file includes the step of placing the plurality of common encapsulated data elements into the filtered source file.

9. The method according to claim 6 wherein the method further comprises the step of producing a custom document output from the filtered source file.

10. The method according to claim 9 wherein the step of producing a custom document output comprises the steps of:

formatting the filtered source file to produce an electronic document which can be read on a display device; and storing the electronic document in a machine-readable format such that the electronic document can be searched and displayed via search and display software.

11. A computer-implemented method of generating a version of a document from a document database, comprising the steps of:

providing a plurality of data objects, wherein each data object includes document information including text or graphics, wherein the plurality of data objects comprises a plurality of first data objects, a plurality of second data objects and a plurality of common data objects;

defining a first class having a first variation name and a second variation name;

associating the first variation name with the plurality of first data objects;

associating the second variation name with the plurality of second data objects;

selecting the data objects associated with a set of variation names, wherein the step of selecting includes the step of adding the first variation name to the set of variation names; and forming an output document wherein the step of forming includes the step of removing the unselected second data objects.

12. The computer-implemented method of claim 11 wherein the step of selecting further comprises the step of adding the second variation name to the set of variation names.

13. The computer-implemented method of claim 11 wherein the step of forming comprises the step of formatting the output document in a predefined format.

14. The computer-implemented method of claim 11 wherein the plurality of data objects includes a third data object and wherein the method further comprises the steps of:

defining a second class having a third variation name;

associating the third variation name with the third data object; and wherein the step of selecting further comprises the step of adding the third variation name to the set of variation names.

15. The computer-implemented method of claim 14 wherein the step of forming comprises the step of formatting the output document in a predefined format.

16. The computer-implemented method of claim 11 wherein the method further comprises the steps of:

defining a second class having a third variation name;

associating the third variation name with one of the second data objects; and wherein the step of selecting further comprises the step of adding the third variation name to the set of variation names.

17. The computer-implemented method of claim 16 wherein the step of forming comprises the step of formatting the output document in a predefined format.

18. A document generation system for generating a variety of documents from a common document database, comprising:

authoring means for entering a document having a plurality of data objects, wherein the plurality of data objects includes a plurality of first data objects, a plurality of second data objects and a plurality of common data objects, wherein each data object includes document information including text or graphics, wherein the authoring means includes first class assigning means for assigning a first class having a first and a second variation name to each of the first and second data objects, wherein the first class assigning means comprises means for associating the plurality of first data objects with the first variation name and means for associating the plurality of second data objects with the second variation name;

document validation means for determining that the document is in a predetermined format; and document filtering means for removing data objects associated with the second variation name.

19. The system according to claim 18, wherein the plurality of first data objects includes a third data object and wherein:

the authoring means further includes second class assigning means for assigning a second class having a third variation name, wherein the second class assigning means comprises means for associating the third data object with the third variation name; and the document filtering means includes means for removing data objects associated with the third variation name.

20. The system according to claim 18, wherein the plurality of data objects further include a third and a fourth data object and wherein:

the authoring means further includes second class assigning means for assigning a second class having a third and a fourth variation name, wherein the second class assigning means comprises means for associating the third data object with the third variation name and means for associating the fourth data object with the fourth variation name; and the document filtering means includes means for removing data objects associated with the fourth variation name.

21. The system according to claim 18, wherein the system further comprises formatting means, connected to the document filtering means, for placing the document in a predefined format.

22. A computer implemented method of creating multiple variations of documentation, comprising the steps of:

defining a source file having a plurality of document elements, wherein the document elements include document information including text or graphics;

tagging predetermined ones of said plurality of document elements as first variation document elements;

tagging predetermined ones of said plurality of document elements as second variation document elements;

tagging predetermined ones of said plurality of document elements as common document elements;

selecting a first variation;

scanning said source file for selected document elements, wherein the step of scanning includes the step of scanning said source file for first variation document elements and for common document elements; and generating an output document from the document information contained in the selected document elements.

23. The method of claim 22 further comprising the step of selecting a second variation; wherein the step of scanning further includes the step of scanning said source file for second variation document elements and wherein the step of generating comprises the steps of marking as first variation elements the document information from said first variation document elements and as second variation elements the document information from said second variation document elements.

24. A computer-implemented method of generating a version of a document from a document database, comprising the steps of:

providing a plurality of document section objects, wherein the plurality of document section objects includes document section objects having one or more paragraphs and document section objects having one or more illustrations;

dividing the plurality of document section objects into a plurality of first document section objects, a plurality of second document section objects and a plurality of common document section objects;

defining a first class having a first variation name and a second variation name;

associating the first variation name with the plurality of first document section objects;

associating the second variation name with the plurality of second document section objects;

selecting the document section objects associated with a set of variation names, wherein the step of selecting includes the step of adding the first variation name to the set of variation names; and filtering the document database to form an output document comprising the common document section objects and the selected document section objects.

25. The computer-implemented method of claim 24 wherein the step of selecting further comprises the step of adding the second variation name to the set of variation names.

26. The computer-implemented method of claim 24 wherein the step of filtering comprises the step of formatting the output document in a predefined format.

27. The computer-implemented method of claim 24 wherein the method further comprises the steps of:

defining a second class having a third variation name;

associating the third variation name with one of the second document section objects; and wherein the step of selecting further comprises the step of adding the third variation name to the set of variation names.

28. The computer-implemented method of claim 27 wherein the step of filtering comprises the step of formatting the output document in a predefined format.

29. A document generation system for generating a variety of documents from a common document database, comprising:

an input/output device, wherein the input/output device includes authoring means for entering a document having a plurality of encapsulated paragraphs and means for grouping each of the plurality of encapsulated paragraphs into first, second and common encapsulated paragraphs, wherein the authoring means includes first class assigning means for assigning a first class having a first and a second variation name to each of the first and second encapsulated paragraphs, wherein the first class assigning means comprises means for associating the first encapsulated paragraphs with the first variation name and means for associating the second encapsulated paragraphs with the second variation name;

document validation means, connected to the input/output device, for determining that the document is in a predetermined format;

storage means, connected to the document validation means, for storing the document; and document filtering means, connected to the storage means, for removing encapsulated paragraphs associated with the second variation name.

30. The system according to claim 29, wherein:

the authoring means further includes second class assigning means for assigning a second class having a third variation name, wherein the second class assigning means comprises means for associating one of the first encapsulated paragraphs with the third variation name; and the document filtering means includes means for removing data objects associated with the third variation name.

31. The system according to claim 29, wherein the system further comprises formatting means, connected to the document filtering means, for placing the document in a predefined format.

32. The system according to claim 29, wherein the document further includes one or more encapsulated illustrations associated with the first variation name and one or more encapsulated illustrations associated with the second variation name, wherein the document filtering means includes means for removing encapsulated illustrations associated with the second variation name.

* * * * *

UNITED STATES PATENT AND TRADEMARK OFFICE
CERTIFICATE OF CORRECTION

PATENT NO. : 5,655,130

DATED : August 5, 1997

INVENTOR(S) : Daniel R. Dodge et al.

It is certified that error appears in the above-identified patent and that said Letters Patent is hereby corrected as shown below:

Col. 2, line 1, please delete “and/heir” and insert --and their--.

Signed and Sealed this

Twenty-sixth Day of May, 1998

*Attest:*

BRUCE LEHMAN

*Attesting Officer* *Commissioner of Patents and Trademarks*